(12) United States Patent
Lance et al.

(10) Patent No.: US 10,392,786 B2
(45) Date of Patent: Aug. 27, 2019

(54) ELECTRONIC PLUMBING FIXTURE FITTING WITH ELECTRONIC VALVE INCLUDING PISTON AND SEAT

(71) Applicant: Moen Incorporated, North Olmsted, OH (US)

(72) Inventors: Matthew J. Lance, North Ridgeville, OH (US); Sanjeev S. Moghe, Chagrin Falls, OH (US)

(73) Assignee: Moen Incorporated, North Olmsted, OH (US)

( * ) Notice: Subject to any disclaimer, the term of this patent is extended or adjusted under 35 U.S.C. 154(b) by 0 days.

(21) Appl. No.: 15/001,141

(22) Filed: Jan. 19, 2016

(65) Prior Publication Data

US 2016/0208945 A1    Jul. 21, 2016

Related U.S. Application Data

(60) Provisional application No. 62/105,174, filed on Jan. 19, 2015.

(51) Int. Cl.
| | |
|---|---|
| *F16K 1/38* | (2006.01) |
| *F16K 1/52* | (2006.01) |
| *F16K 1/54* | (2006.01) |
| *E03C 1/05* | (2006.01) |
| *F16K 11/22* | (2006.01) |
| *F16K 27/02* | (2006.01) |
| *F16K 31/04* | (2006.01) |

(52) U.S. Cl.
CPC ............... *E03C 1/057* (2013.01); *F16K 1/38* (2013.01); *F16K 1/385* (2013.01); *F16K 11/22* (2013.01); *F16K 27/0263* (2013.01); *F16K 31/04* (2013.01)

(58) Field of Classification Search
CPC ........ F16K 1/38; F16K 1/42–427; F16K 1/52; F16K 1/54
USPC ................................................... 251/205, 364
See application file for complete search history.

(56) References Cited

U.S. PATENT DOCUMENTS

| 82,270 | A | * | 9/1868 | Ashcroft | F15K 1/42 |
| | | | | | 251/356 |
| 2,768,807 | A | * | 10/1956 | Cahen | F16K 1/38 |
| | | | | | 251/218 |
| 2,844,324 | A | * | 7/1958 | Stonich | F16K 1/52 |
| | | | | | 137/154 |
| 2,949,096 | A | * | 8/1960 | Ottestad | F15B 15/221 |
| | | | | | 73/12.01 |
| 3,010,695 | A | * | 11/1961 | Banks | F16K 39/022 |
| | | | | | 251/205 |

(Continued)

FOREIGN PATENT DOCUMENTS

| CN | 2438879 Y | 7/2001 |
| WO | 9939978 | 8/1999 |

OTHER PUBLICATIONS

International Search Report for International App. No. PCT/US2016/013962 dated Jul. 12, 2016 (4 pages).

(Continued)

*Primary Examiner* — Seth W. Mackay-Smith
(74) *Attorney, Agent, or Firm* — Calfee, Halter & Griswold LLP

(57) ABSTRACT

The present invention provides an electronic plumbing fixture fitting with an electronic valve including a piston and a seat, such as an electronic faucet with an electronic valve including a piston and a seat.

20 Claims, 29 Drawing Sheets

(56) References Cited

U.S. PATENT DOCUMENTS

| | | | | |
|---|---|---|---|---|
| 3,228,655 | A | * | 1/1966 | Weise ............... F16K 1/42 251/122 |
| 4,364,493 | A | * | 12/1982 | Raynes ............... B67D 1/04 137/114 |
| 4,420,811 | A | | 12/1983 | Tarnay et al. |
| 4,524,914 | A | * | 6/1985 | Kaibara ............... F02M 61/06 239/452 |
| 4,572,055 | A | | 2/1986 | Schiel |
| 4,610,424 | A | | 9/1986 | Koppers et al. |
| 4,638,832 | A | | 1/1987 | Mokveld |
| 4,682,728 | A | | 7/1987 | Oudenhoven et al. |
| 4,760,866 | A | | 8/1988 | Adler |
| 4,854,499 | A | | 8/1989 | Neuman |
| 4,931,938 | A | | 6/1990 | Hass |
| 5,050,062 | A | | 9/1991 | Hass |
| 5,165,654 | A | * | 11/1992 | Liu ............... F24C 3/12 251/121 |
| 5,244,118 | A | * | 9/1993 | Fallon ............... B67D 1/1252 137/114 |
| 5,294,045 | A | | 3/1994 | Harris |
| 5,358,177 | A | | 10/1994 | Cashmore |
| 5,868,164 | A | | 2/1999 | Haskett |
| 5,967,164 | A | * | 10/1999 | Denda ............... F16K 1/38 137/1 |
| 6,250,602 | B1 | * | 6/2001 | Jansen ............... F02K 9/58 251/124 |
| 6,446,834 | B2 | * | 9/2002 | Davis ............... B67D 1/0037 137/100 |
| 6,460,567 | B1 | * | 10/2002 | Hansen, III ............... F16K 31/04 137/554 |
| 6,629,645 | B2 | | 10/2003 | Mountford et al. |
| 6,732,997 | B2 | | 5/2004 | Beh et al. |
| 6,776,360 | B2 | * | 8/2004 | Haruch ............... B05B 1/306 239/526 |
| 6,783,108 | B2 | * | 8/2004 | Jansen ............... G05D 11/006 251/127 |
| 6,802,487 | B2 | * | 10/2004 | Heun ............... F16K 3/34 251/122 |
| 6,811,141 | B2 | * | 11/2004 | Green ............... F16K 1/34 251/149.8 |
| 6,854,658 | B1 | | 2/2005 | Houghton et al. |
| 7,044,434 | B2 | | 5/2006 | Brinks et al. |
| 7,156,267 | B2 | | 1/2007 | Langa |
| 7,240,694 | B2 | * | 7/2007 | Johnsen ............... F16K 1/10 137/630.15 |
| 7,537,194 | B2 | | 5/2009 | Nagai |
| 7,913,973 | B1 | * | 3/2011 | Jansen ............... F16K 1/54 251/122 |
| 8,162,236 | B2 | | 4/2012 | Rodenbeck et al. |
| 8,210,441 | B2 | | 7/2012 | Kempf et al. |
| 8,267,107 | B2 | | 9/2012 | Ho |
| 8,297,303 | B2 | | 10/2012 | DeSantis et al. |
| 8,496,025 | B2 | | 7/2013 | Parsons et al. |
| 9,010,377 | B1 | | 4/2015 | O'Brien et al. |
| 9,194,110 | B2 | | 11/2015 | Rick et al. |
| 9,212,473 | B2 | | 12/2015 | Baker et al. |
| 9,366,342 | B2 | * | 6/2016 | Labrie ............... F16K 1/36 |
| 9,758,951 | B2 | | 9/2017 | Evans et al. |
| 9,828,751 | B2 | | 11/2017 | Parikh et al. |
| 2004/0041034 | A1 | | 3/2004 | Kemp |
| 2012/0216893 | A1 | | 8/2012 | Shapira |
| 2013/0248033 | A1 | | 9/2013 | Parikh et al. |
| 2013/0340162 | A1 | | 12/2013 | Peel |
| 2013/0340835 | A1 | | 12/2013 | Peel |
| 2013/0340848 | A1 | | 12/2013 | Peel |
| 2013/0340849 | A1 | | 12/2013 | Peel |
| 2013/0340850 | A1 | | 12/2013 | Peel |
| 2013/0340851 | A1 | | 12/2013 | Peel |
| 2013/0340852 | A1 | | 12/2013 | Peel |
| 2013/0340853 | A1 | | 12/2013 | Peel |
| 2013/0340863 | A1 | | 12/2013 | Peel |
| 2013/0340869 | A1 | | 12/2013 | Peel |
| 2013/0341418 | A1 | | 12/2013 | Peel |
| 2013/0341425 | A1 | | 12/2013 | Peel |
| 2014/0021384 | A1 | | 1/2014 | Kabel et al. |
| 2014/0175311 | A1 | * | 6/2014 | Jamison ............... F16K 1/42 251/129.15 |
| 2016/0076233 | A1 | | 3/2016 | Parikh et al. |

OTHER PUBLICATIONS

Written Opinion of the International Searching Authority for International App. No. PCT/US2016/013962 dated Jul. 12, 2016 (7 pages).

First Office Action issued by the State Intellectual Property Office of the People's Republic of China for Chinese App. No. 201610249971.9 dated Oct. 12, 2018 (20 pages).

* cited by examiner

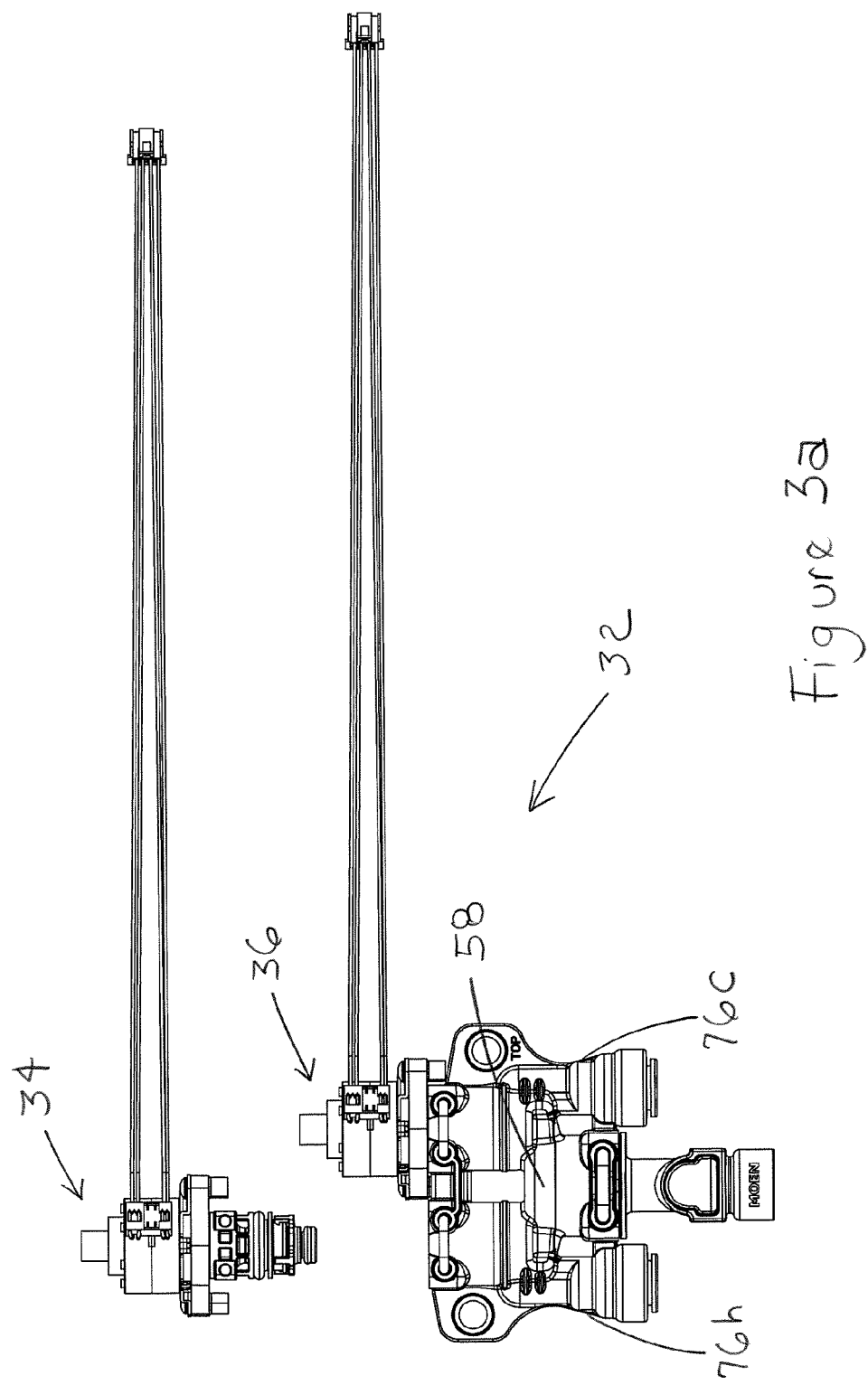

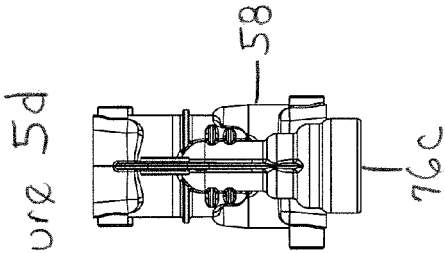
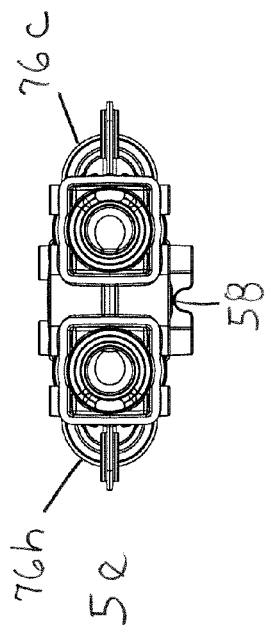
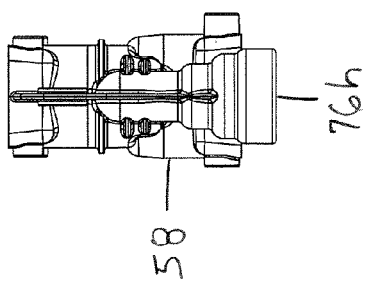
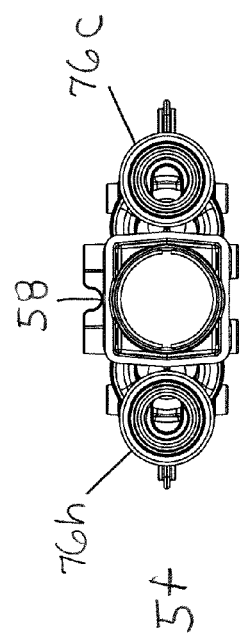
Figure 5a  Figure 5b  Figure 5d
Figure 5c  Figure 5f

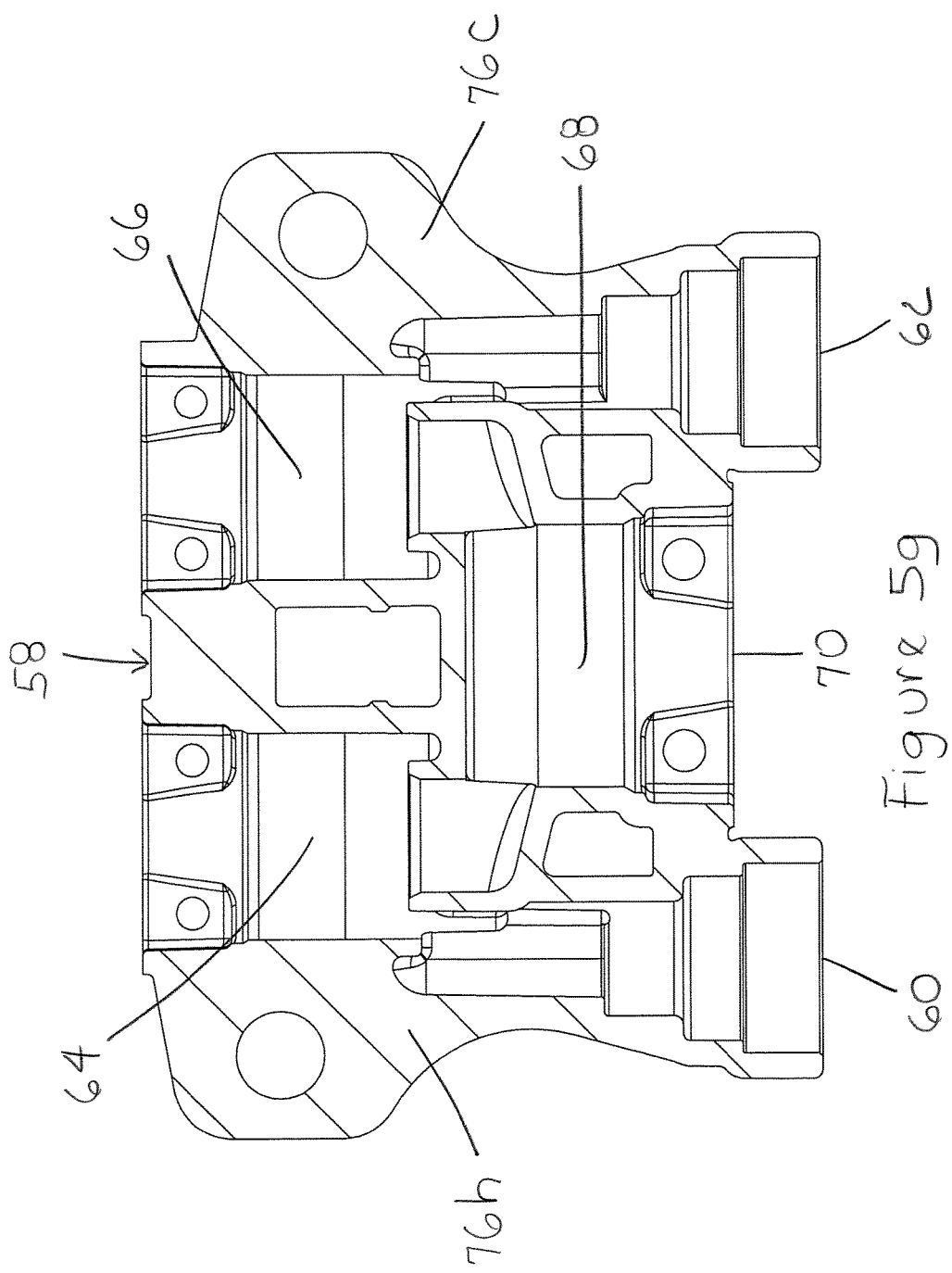

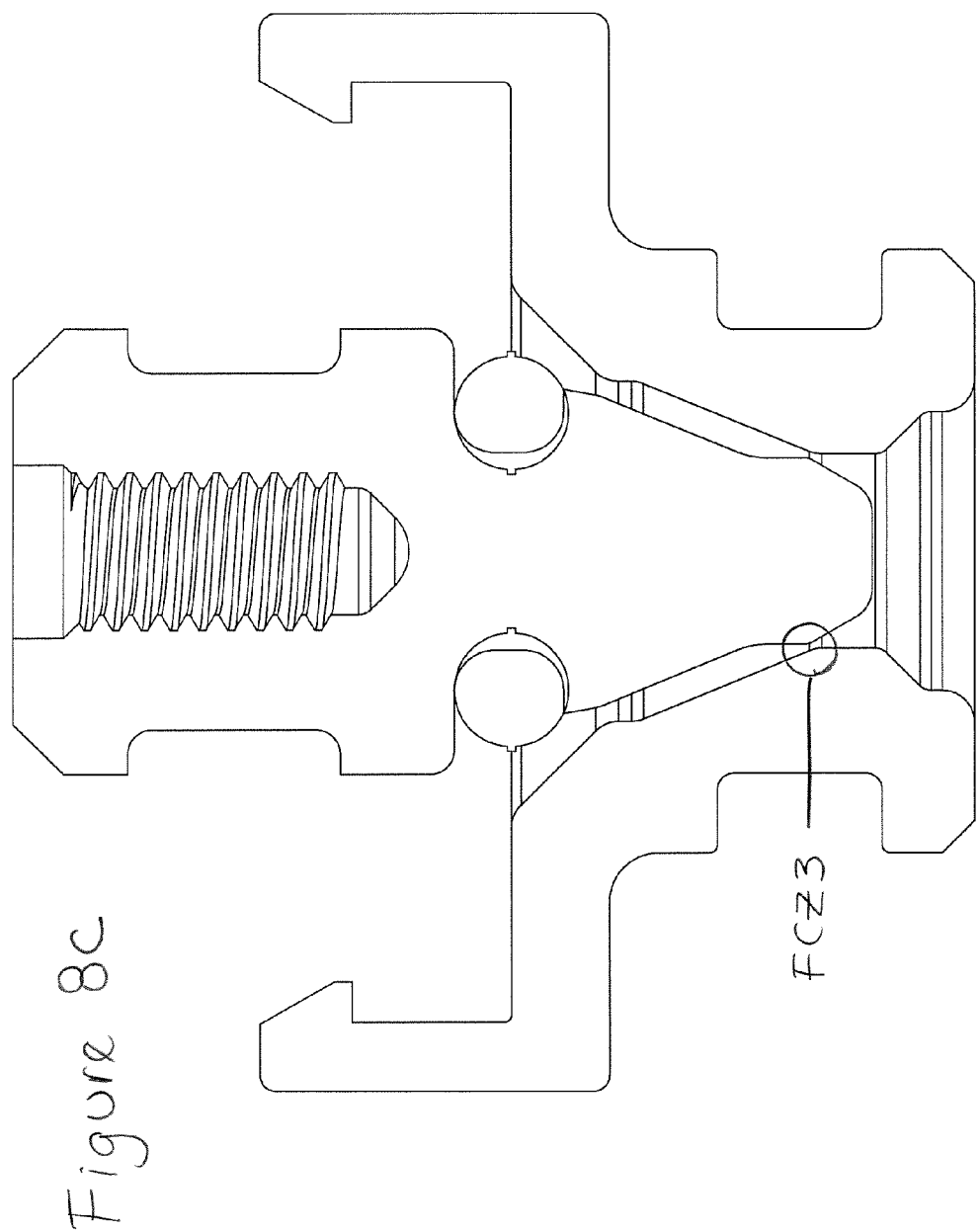

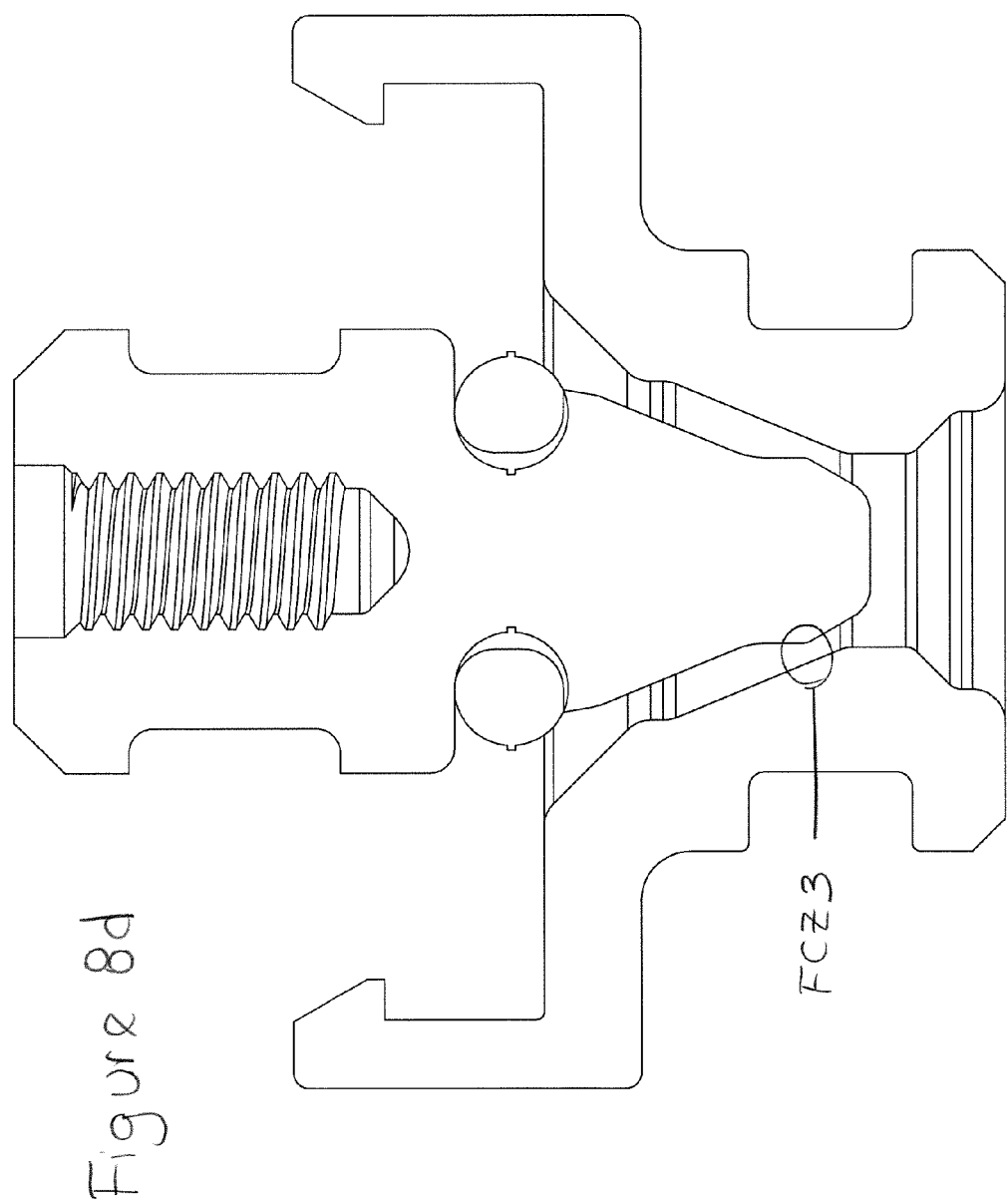

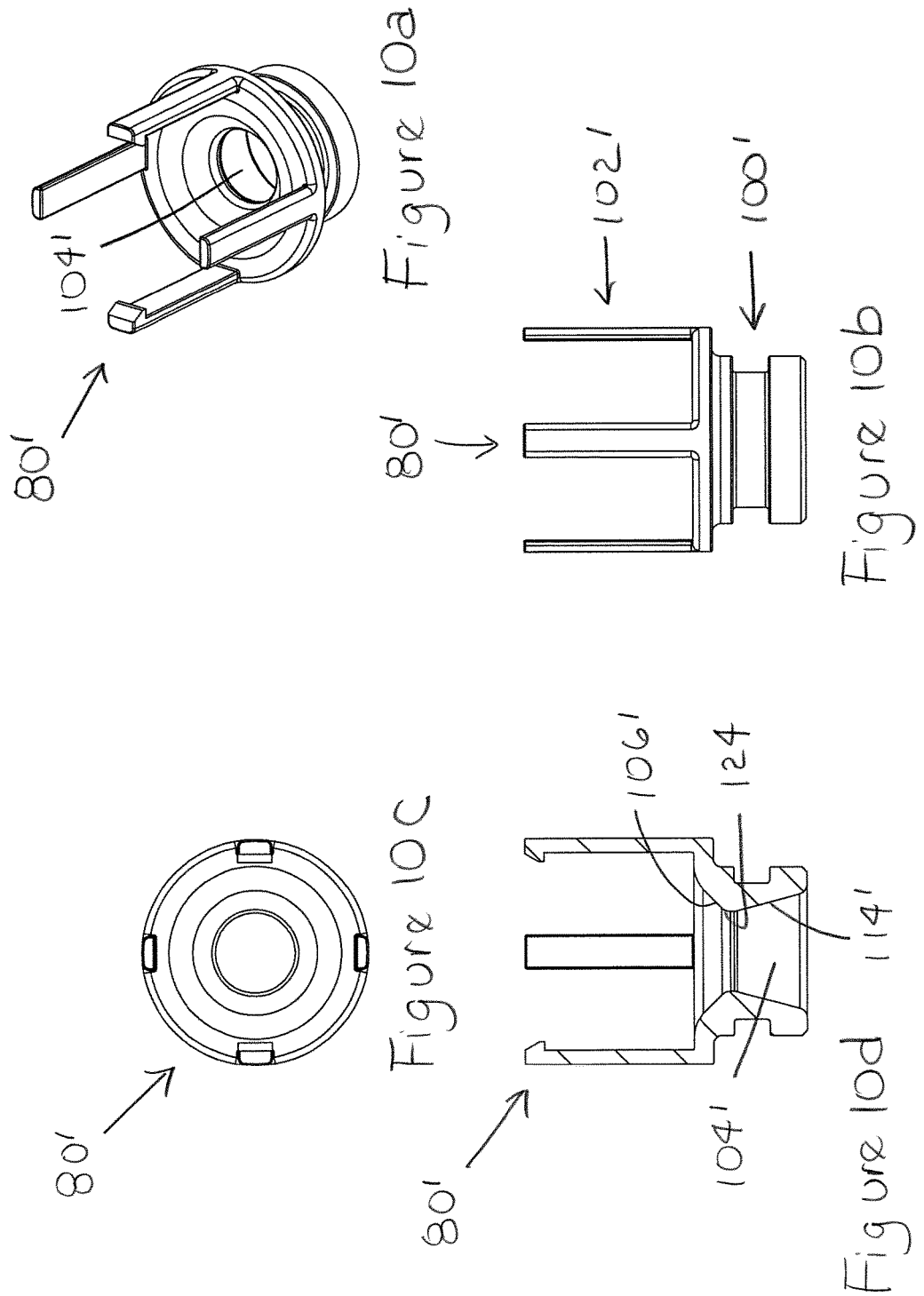

| Step | Flow Rate (GPM) |
|---|---|
| 0 | 0 |
| 1 | 0 |
| 2 | 0 |
| 3 | 0 |
| 4 | 0 |
| 5 | 0 |
| 6 | 0 |
| 7 | 0.07 |
| 8 | 0.13 |
| 9 | 0.13 |
| 10 | 0.14 |
| 11 | 0.14 |
| 12 | 0.15 |
| 13 | 0.15 |
| 14 | 0.15 |
| 15 | 0.15 |
| 16 | 0.16 |
| 17 | 0.16 |
| 18 | 0.17 |
| 19 | 0.17 |
| 20 | 0.18 |
| 21 | 0.19 |
| 22 | 0.2 |
| 23 | 0.2 |
| 24 | 0.21 |
| 25 | 0.22 |
| 26 | 0.23 |
| 27 | 0.24 |
| 28 | 0.26 |
| 29 | 0.27 |
| 30 | 0.29 |
| 31 | 0.31 |
| 32 | 0.34 |
| 33 | 0.35 |
| 34 | 0.39 |
| 35 | 0.41 |
| 36 | 0.45 |
| 37 | 0.47 |
| 38 | 0.51 |
| 39 | 0.53 |
| 40 | 0.58 |

| Step | Flow Rate (GPM) |
|---|---|
| 41 | 0.59 |
| 42 | 0.64 |
| 43 | 0.66 |
| 44 | 0.71 |
| 45 | 0.72 |
| 46 | 0.76 |
| 47 | 0.79 |
| 48 | 0.83 |
| 49 | 0.85 |
| 50 | 0.89 |
| 51 | 0.91 |
| 52 | 0.94 |
| 53 | 0.96 |
| 54 | 1 |
| 55 | 1.02 |
| 56 | 1.05 |
| 57 | 1.07 |
| 58 | 1.1 |
| 59 | 1.12 |
| 60 | 1.15 |
| 61 | 1.16 |
| 62 | 1.19 |
| 63 | 1.2 |
| 64 | 1.23 |
| 65 | 1.24 |
| 66 | 1.26 |
| 67 | 1.29 |
| 68 | 1.31 |
| 69 | 1.32 |
| 70 | 1.35 |
| 71 | 1.37 |
| 72 | 1.39 |
| 73 | 1.4 |
| 74 | 1.42 |
| 75 | 1.43 |
| 76 | 1.46 |
| 77 | 1.47 |
| 78 | 1.49 |
| 79 | 1.5 |
| 80 | 1.52 |

Figure 12b

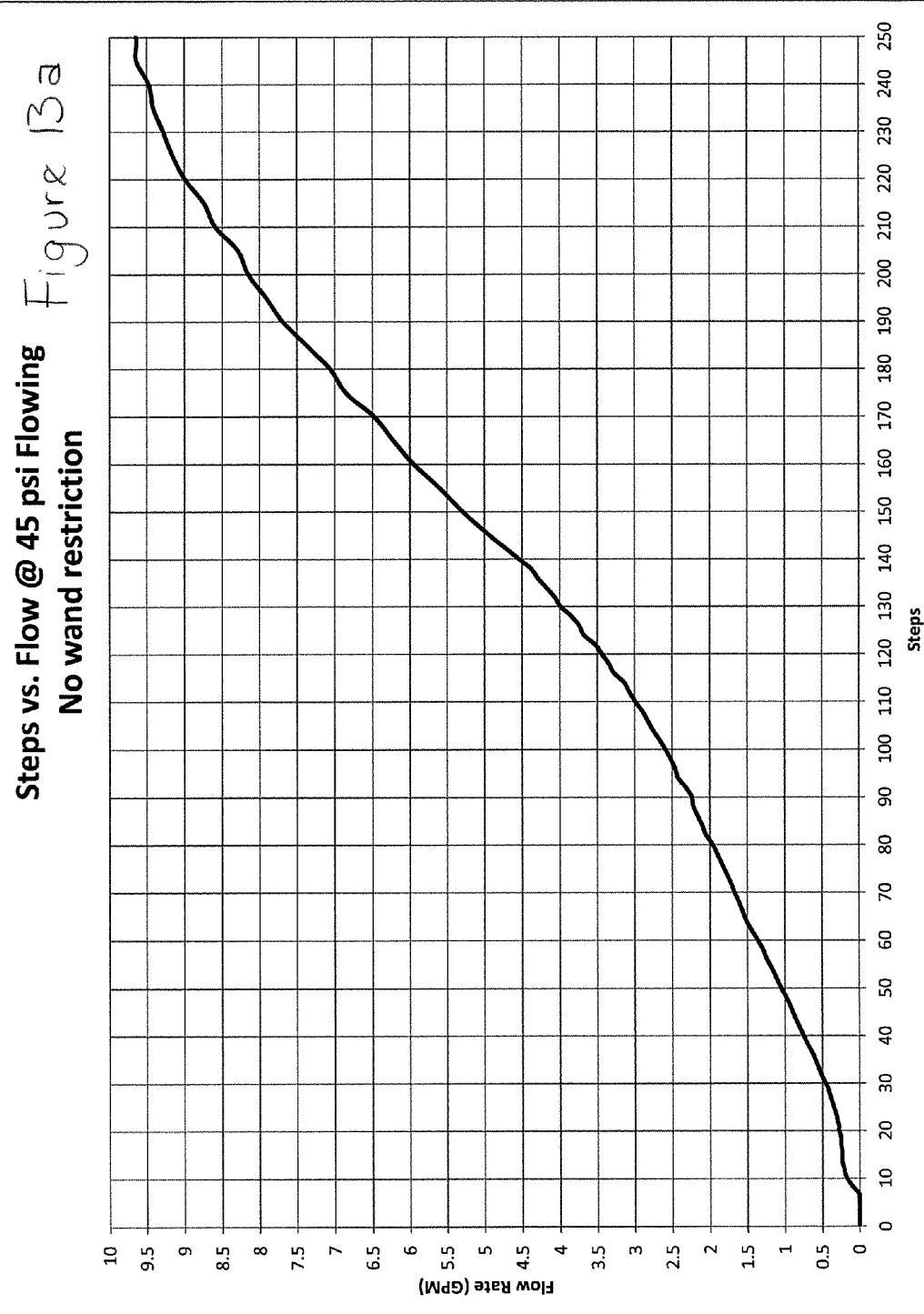

| Step | Flow Rate (GPM) | Step | Flow Rate (GPM) | Step | Flow Rate (GPM) |
|---|---|---|---|---|---|
| 0 | 0 | 52 | 1.11 | 134 | 4.18 |
| 1 | 0 | 54 | 1.17 | 136 | 4.29 |
| 2 | 0 | 56 | 1.24 | 138 | 4.38 |
| 3 | 0 | 58 | 1.29 | 140 | 4.54 |
| 4 | 0 | 60 | 1.36 | 145 | 4.93 |
| 5 | 0 | 62 | 1.44 | 150 | 5.29 |
| 6 | 0 | 64 | 1.51 | 155 | 5.6 |
| 7 | 0.02 | 66 | 1.56 | 160 | 5.95 |
| 8 | 0.08 | 68 | 1.61 | 165 | 6.22 |
| 9 | 0.13 | 70 | 1.67 | 170 | 6.48 |
| 10 | 0.17 | 72 | 1.72 | 175 | 6.85 |
| 11 | 0.2 | 74 | 1.78 | 180 | 7.06 |
| 12 | 0.21 | 76 | 1.84 | 185 | 7.37 |
| 13 | 0.23 | 78 | 1.9 | 190 | 7.69 |
| 14 | 0.24 | 80 | 1.96 | 195 | 7.91 |
| 15 | 0.24 | 82 | 2.05 | 200 | 8.15 |
| 16 | 0.24 | 84 | 2.1 | 205 | 8.29 |
| 17 | 0.25 | 86 | 2.16 | 210 | 8.59 |
| 18 | 0.25 | 88 | 2.22 | 215 | 8.74 |
| 19 | 0.26 | 90 | 2.24 | 220 | 8.99 |
| 20 | 0.28 | 92 | 2.32 | 225 | 9.16 |
| 21 | 0.28 | 94 | 2.42 | 230 | 9.28 |
| 22 | 0.3 | 96 | 2.46 | 235 | 9.41 |
| 23 | 0.31 | 98 | 2.52 | 240 | 9.47 |
| 24 | 0.33 | 100 | 2.59 | 245 | 9.64 |
| 25 | 0.35 | 102 | 2.67 | 250 | 9.64 |
| 26 | 0.37 | 104 | 2.76 | | |
| 27 | 0.39 | 106 | 2.83 | | |
| 28 | 0.41 | 108 | 2.9 | | |
| 29 | 0.43 | 110 | 2.99 | | |
| 30 | 0.46 | 112 | 3.07 | | |
| 32 | 0.52 | 114 | 3.14 | | |
| 34 | 0.57 | 116 | 3.28 | | |
| 36 | 0.62 | 118 | 3.35 | | |
| 38 | 0.69 | 120 | 3.44 | | |
| 40 | 0.75 | 122 | 3.53 | | |
| 42 | 0.81 | 124 | 3.68 | | |
| 44 | 0.87 | 126 | 3.74 | | |
| 46 | 0.92 | 128 | 3.85 | | |
| 48 | 0.98 | 130 | 3.99 | | |
| 50 | 1.05 | 132 | 4.07 | | |

Figure 13b

ELECTRONIC PLUMBING FIXTURE FITTING WITH ELECTRONIC VALVE INCLUDING PISTON AND SEAT

CROSS-REFERENCE TO RELATED APPLICATION

This application claims the benefit of U.S. Provisional Application No. 62/105,174, filed Jan. 19, 2015, the entire disclosure of which is hereby incorporated by reference.

FIELD

The present invention relates generally to an electronic plumbing fixture fitting with an electronic valve including a piston and a seat, such as an electronic faucet with an electronic valve including a piston and a seat.

BACKGROUND

Electronic plumbing fixture fittings, such as electronic faucets, are well known. Such electronic plumbing fixture fittings are used in residential and commercial applications, such as in kitchens, bathrooms, and various other locations.

SUMMARY

The present invention provides an electronic plumbing fixture fitting with an electronic valve including a piston and a seat.

In an exemplary embodiment, the electronic plumbing fixture fitting comprises a discharge outlet and an electronic valve. The discharge outlet is operable to deliver water. The electronic valve is operable to permit flow of water through the discharge outlet when the electronic valve is activated and to not permit flow of water through the discharge outlet when the electronic valve is deactivated. The electronic valve includes a piston and a seat. The piston includes a body and a nose. The seat includes a body. The body of the seat includes a central opening extending therethrough. The electronic valve has a sealing zone. The sealing zone is a region where a sealing member on one of the piston and the seat interfaces with the other of the piston and the seat. The electronic valve has a flow control zone. At any given position of the piston relative to the seat, the flow control zone is a region where a portion of the piston interfaces with a portion of the seat. The sealing zone is separate from the flow control zone.

In an exemplary embodiment, the electronic plumbing fixture fitting comprises a discharge outlet and an electronic valve. The discharge outlet is operable to deliver water. The electronic valve is operable to permit flow of water through the discharge outlet when the electronic valve is activated and to not permit flow of water through the discharge outlet when the electronic valve is deactivated. The electronic valve includes a piston and a seat. The piston includes a body and a nose. The nose of the piston includes a conical portion and a cylindrical portion. The seat includes a body. The body of the seat includes a central opening extending therethrough. The central opening includes an inlet portion, a conical portion, and a cylindrical portion. The nose of the piston is operable to be received in and move in and out of the central opening in the seat.

In an exemplary embodiment, the electronic plumbing fixture fitting comprises a discharge outlet and an electronic valve. The discharge outlet is operable to deliver water. The electronic valve is operable to permit flow of water through the discharge outlet when the electronic valve is activated and to not permit flow of water through the discharge outlet when the electronic valve is deactivated. The electronic valve includes a piston and a seat. The piston includes a body and a nose. The nose of the piston includes a dome-shaped portion. The seat includes a body. The body of the seat includes a central opening extending therethrough. The central opening includes an inlet portion and a rounded portion. The nose of the piston is operable to be received in and move in and out of the central opening in the seat.

BRIEF DESCRIPTION OF THE DRAWINGS

FIGS. 3a and 3b include views of an electronic mixing valve, including a hot water electronic valve, a cold water electronic valve, and a housing, according to an exemplary embodiment of the present invention—FIG. 3a is an exploded perspective view, and FIG. 3b is a central cross-sectional view;

—FIG. 4a is a perspective view, FIG. 4b is an exploded perspective view, FIG. 4c is a front view, FIG. 4d is a top view, FIG. 4e is a bottom view, and FIG. 4f is a central cross-sectional view;

FIGS. 5a-5g include views of the housing of FIGS. 3a and 3b, according to an exemplary embodiment of the present invention—FIG. 5a is a perspective view, FIG. 5b is a front view, FIG. 5c is a left view, FIG. 5d is a right view, FIG. 5e is a top view, FIG. 5f is a bottom view, and FIG. 5g is a central cross-sectional view;

—FIG. 6a is a perspective view, FIG. 6b is a front view, FIG. 6c is a left view, FIG. 6d is a central cross-sectional view, and FIG. 6e is a detailed front view of the nose;

—FIG. 7a is a perspective view, FIG. 7b is a front view, FIG. 7c is a top view, FIG. 7d is a central cross-sectional view, and FIG. 7e is a detailed central cross-sectional view of a portion of the body;

FIGS. 8a-8e include central cross-sectional views of the piston and the seat of FIGS. 6a-6e and 7a-7e during various phases of operation of the hot/cold water electronic valve of FIGS. 4a-4f incorporating the piston and the seat of FIGS. 6a-6e and 7a-7e-FIG. 8a shows a completely closed position, FIG. 8b shows a cracked open position, FIG. 8c shows an open position in which flow begins to increase, FIG. 8d shows a half open position, and FIG. 8e shows a completely open position;

—FIG. 9a is a perspective view, FIG. 9b is a front view, FIG. 9c is a left view, and FIG. 9d is a central cross-sectional view;

FIGS. 10a-10d include views of another embodiment of a seat, including a body and projections, according to another exemplary embodiment of the present invention—

FIG. 10a is a perspective view, FIG. 10b is a front view, FIG. 10c is a top view, and FIG. 10d is a central cross-sectional view;

FIGS. 11a-11e include central cross-sectional views of the piston and the seat of FIGS. 9a-9d and 10a-10d during various phases of operation of the hot/cold water electronic valve of FIGS. 4a-4f incorporating the piston and the seat of FIGS. 9a-9d and 10a-10d-FIG. 11a shows a completely closed position, FIG. 11b shows a cracked open position, FIG. 11c shows an open position in which flow begins to increase, FIG. 11d shows a half open position, and FIG. 11e shows a completely open position;

FIGS. 12a and 12b include flow rate data for the hot/cold water electronic valve of FIGS. 4a-4f incorporating the piston and the seat of FIGS. 6a-6e and 7a-7e-FIG. 12a is a graph showing the flow rate data, and FIG. 12b is a chart showing the flow rate data; and FIGS. 13a and 13b include flow rate data for the hot/cold water electronic valve of FIGS. 4a-4f incorporating the piston and the seat of FIGS. 9a-9d and 10a-10d-FIG. 13a is a graph showing the flow rate data, and FIG. 13b is a chart showing the flow rate data.

DETAILED DESCRIPTION

The present invention provides an electronic plumbing fixture fitting. In an exemplary embodiment, the electronic plumbing fixture fitting is an electronic faucet. However, one of ordinary skill in the art will appreciate that the electronic plumbing fixture fitting could be an electronic showering system, an electronic showerhead, an electronic handheld shower, an electronic body spray, an electronic side spray, or any other electronic plumbing fixture fitting.

Figure 1:
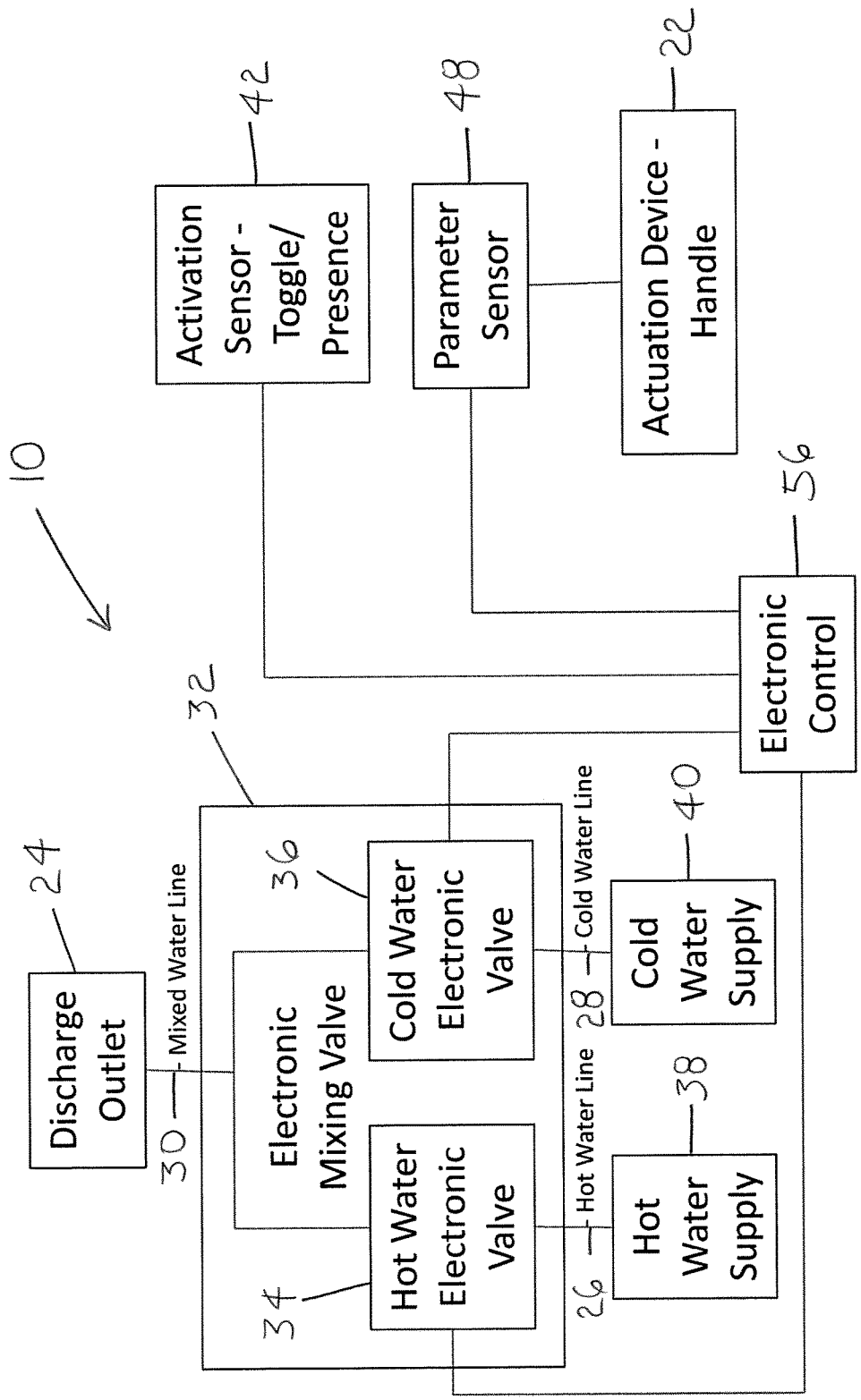
FIG. 1 is a schematic illustration of an electronic plumbing fixture fitting according to an exemplary embodiment of the present invention.

An exemplary embodiment of an electronic plumbing fixture fitting 10, such as an electronic faucet 12, is illustrated in FIG. 1. An exemplary embodiment of the electronic faucet 12 is illustrated in FIG. 2.

Figure 2:
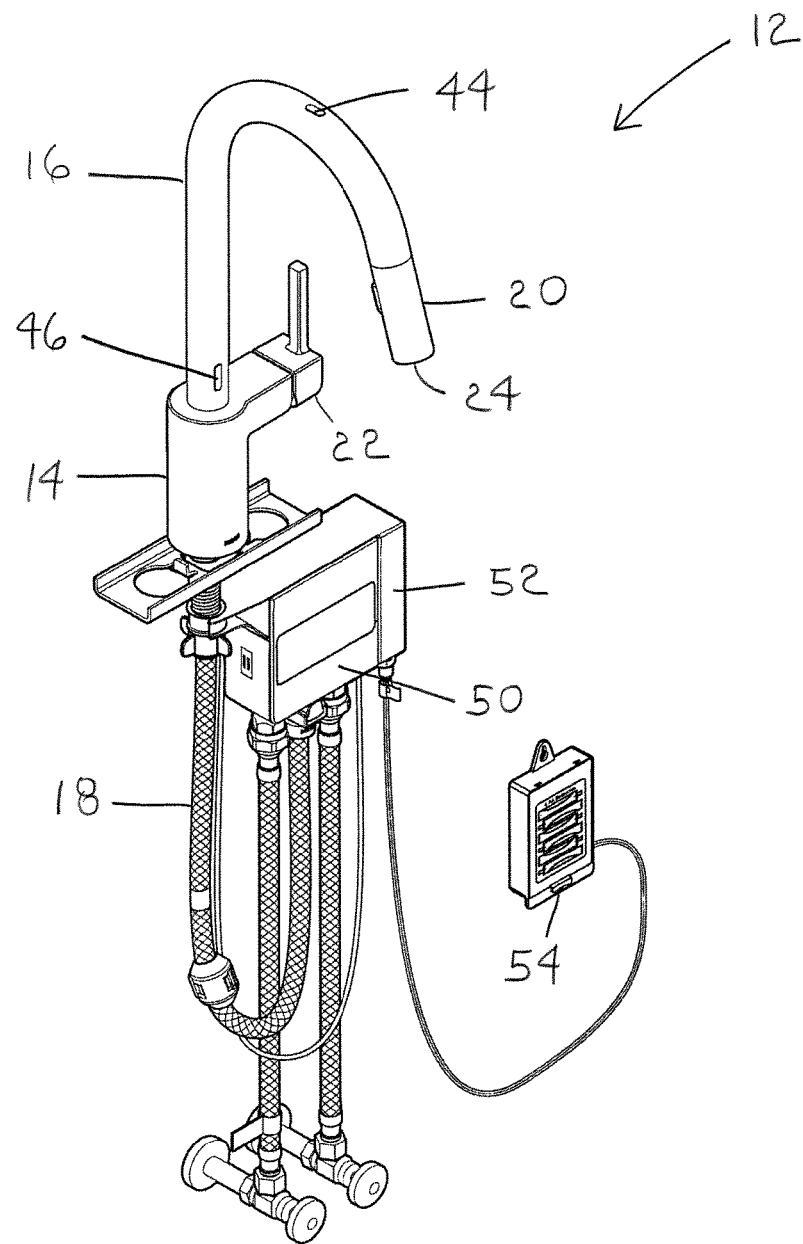
FIG. 2 is a perspective view of an electronic faucet according to an exemplary embodiment of the present invention.
Figure 3B:
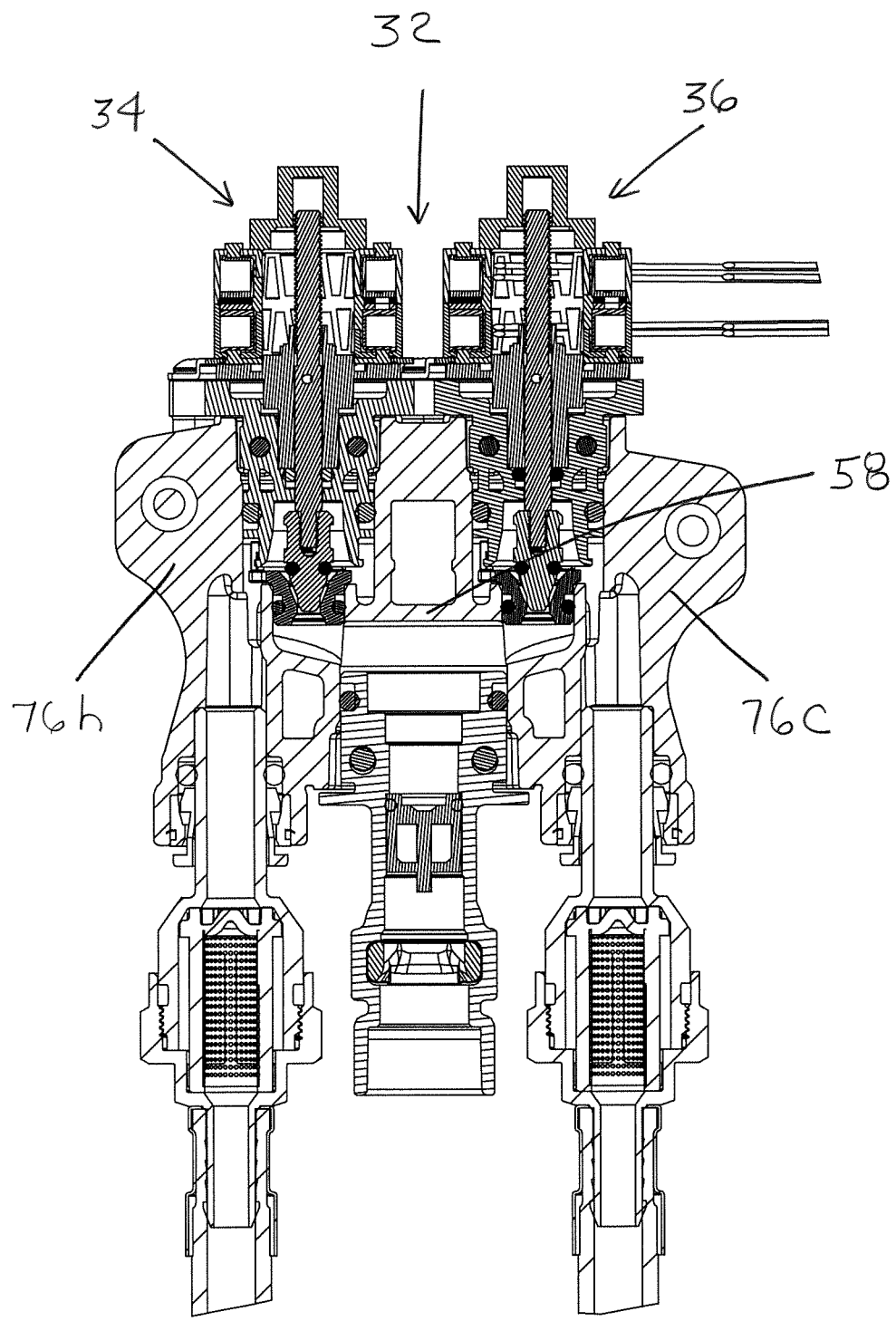
Figure 4A:
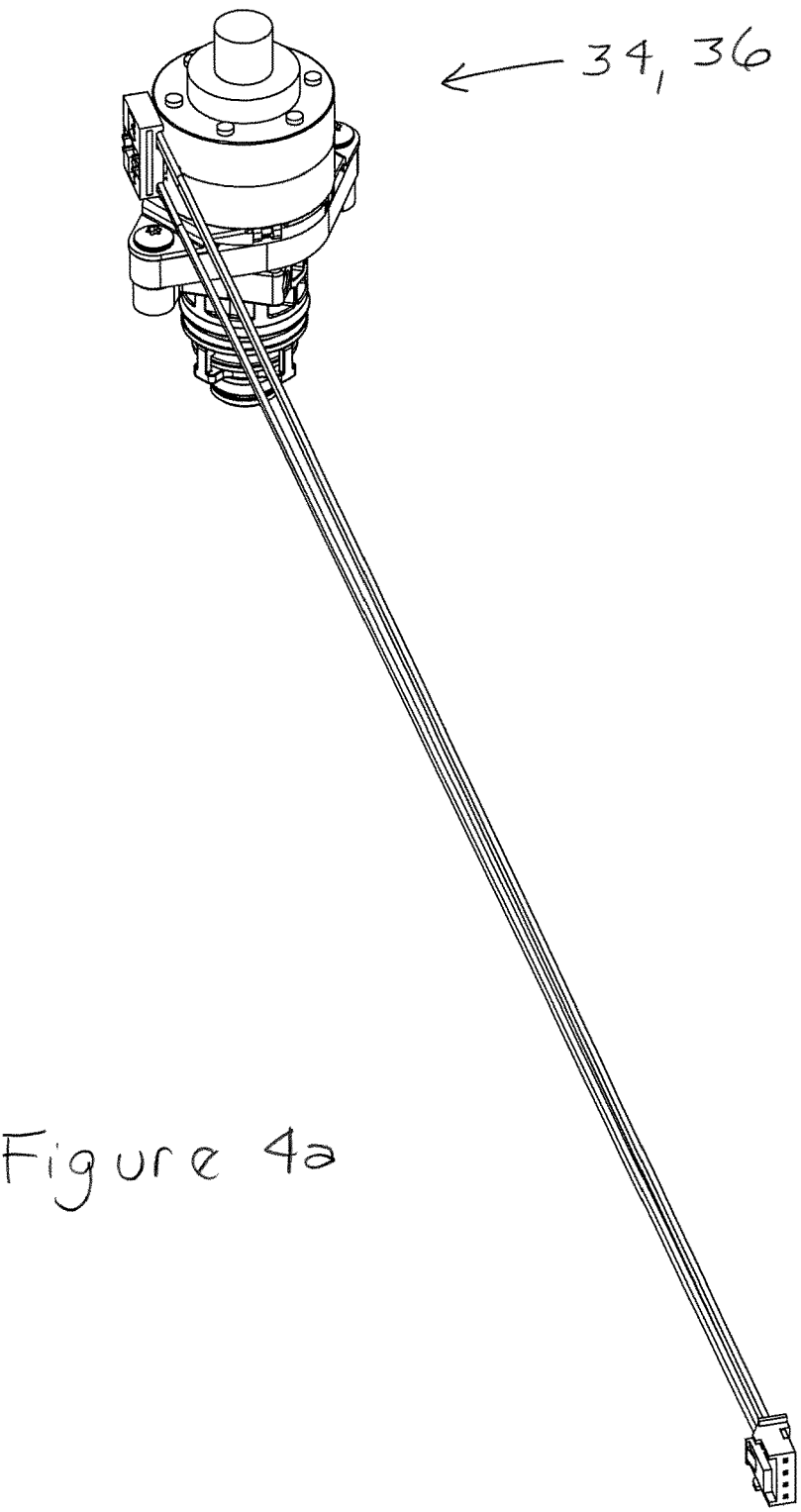
FIGS. 4a-4f include views of the hot/cold water electronic valve of FIGS. 3a and 3b, including a piston and a seat, according to an exemplary embodiment of the present invention
Figure 4B:
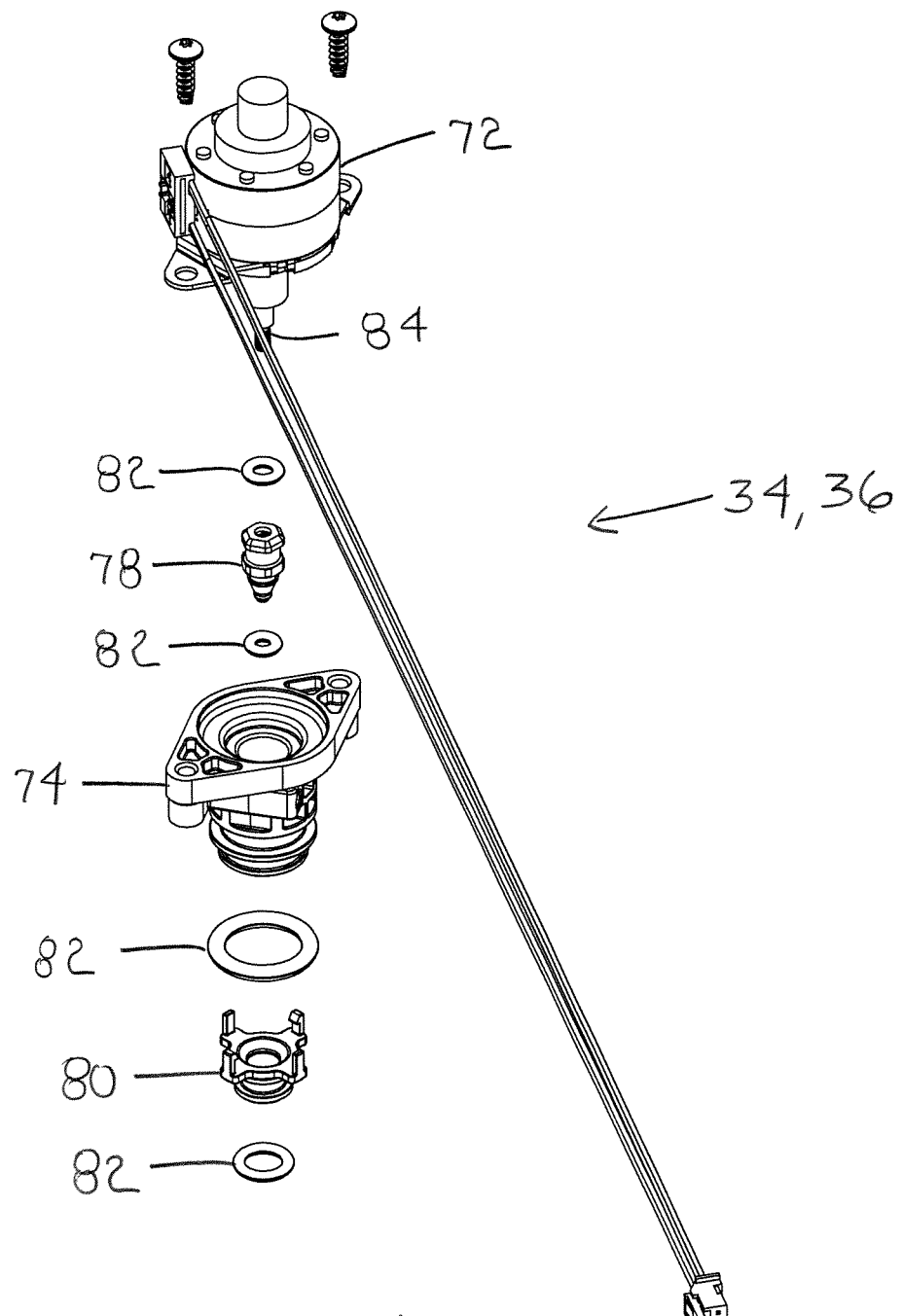
Figure 4D:
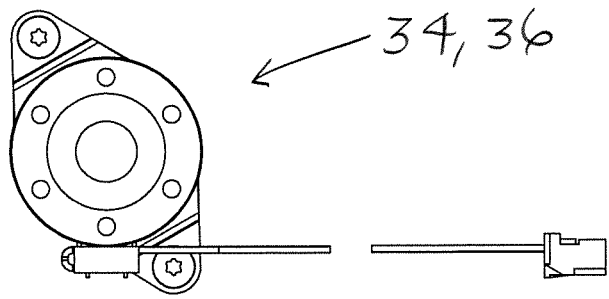
Figure 4C:
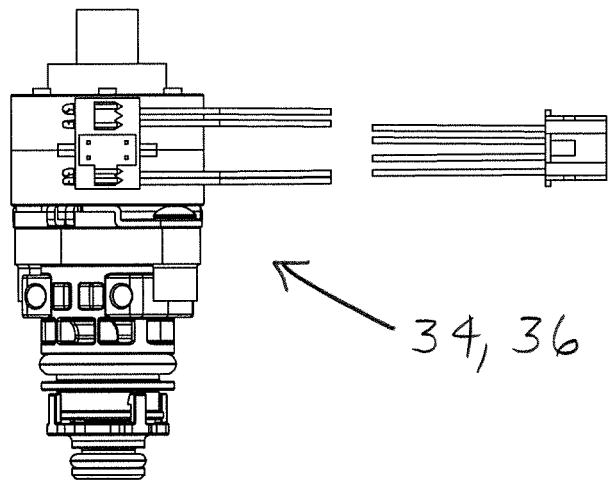
Figure 4E:
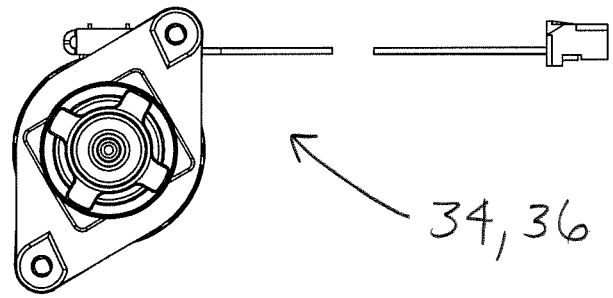
Figure 4F:
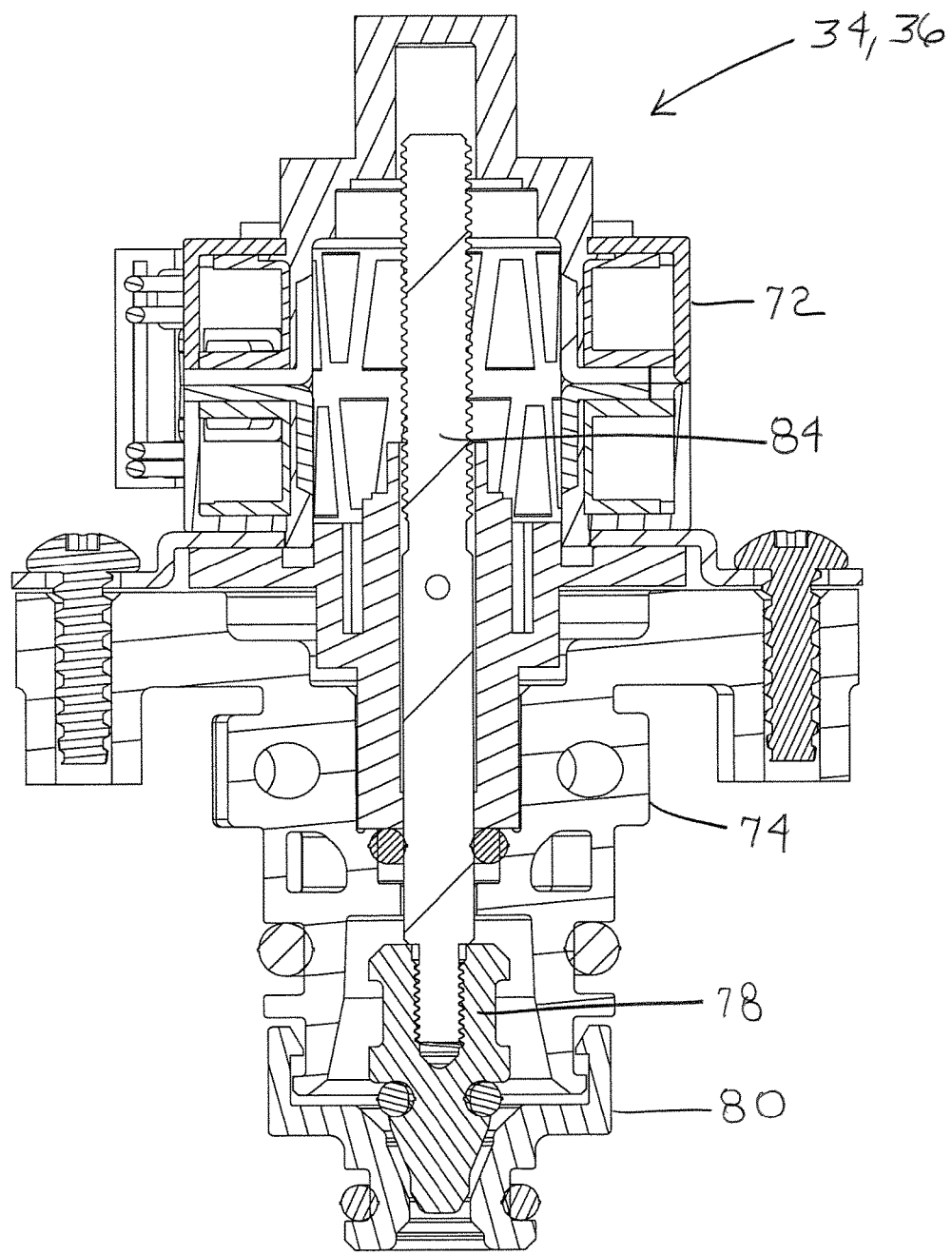
Figure 5A:
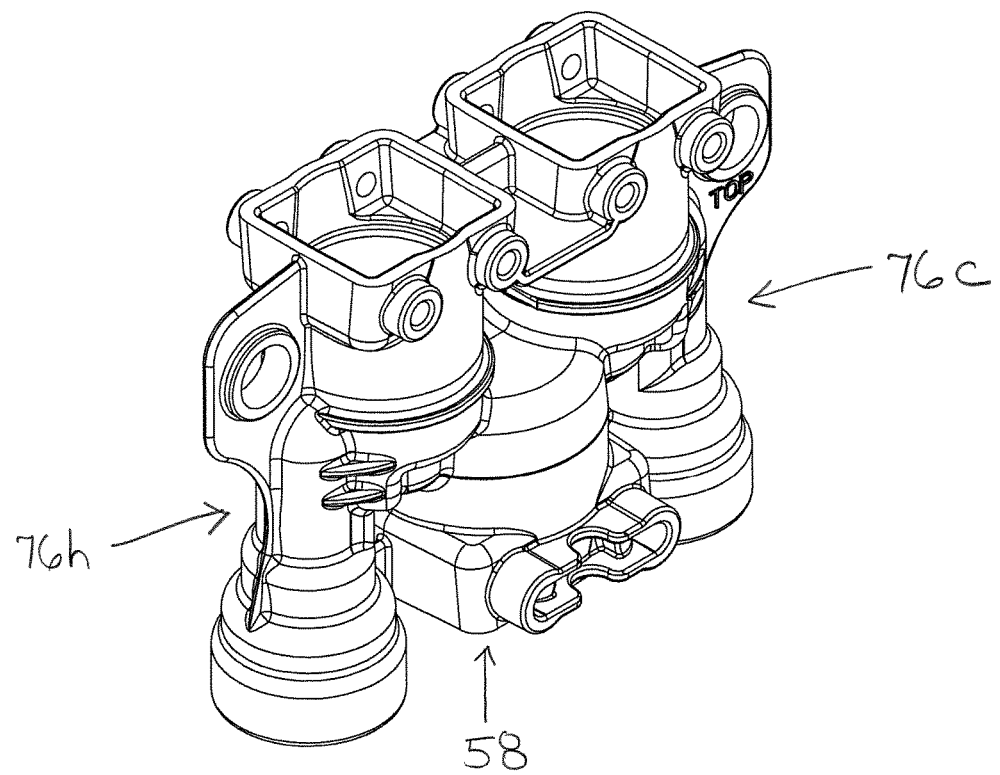

In the illustrated embodiment, as best shown in FIG. 2, the faucet 12 includes a hub 14, a spout 16, a flexible hose 18, a wand 20, and a handle 22. An upstream end of the hub 14 is connected to a mounting surface (such as a counter or sink). An upstream end of the spout 16 is connected to a downstream end of the hub 14. The spout 16 is operable to rotate relative to the hub 14. The flexible hose 18 extends through the hub 14 and the spout 16 and is operable to move within the hub 14 and the spout 16. An upstream end of the wand 20 is mounted in a downstream end of the spout 16 and is connected to a downstream end of the flexible hose 18. A downstream end of the wand 20 includes a discharge outlet 24 through which water is delivered from the faucet 12. The wand 20 is operable to be pulled away from the spout 16. The handle 22 covers a side opening in the hub 14 and is operable to be moved relative to the hub 14. Although the faucet 12 has been described as having a rotatable spout 16, a pull-out or pull-down wand 20, and a handle 22 mounted on the hub 14, one of ordinary skill in the art will appreciate that the spout 16 could be fixed relative to the hub 14, the faucet 12 may not include a wand 20, the handle 22 may be mounted on other locations on the faucet 12 or remote from the faucet 12, the faucet 12 could include more than one handle 22, the handle 22 may be any mechanical actuation device or user interface, and/or the faucet 12 may not include a handle 22.

Additionally, in the illustrated embodiment, as best shown in FIG. 1, the fitting 10 includes a hot water line 26, a cold water line 28, a mixed water line 30, and an electronic mixing valve 32. The electronic mixing valve 32 includes a hot water electronic valve 34 and a cold water electronic valve 36. An upstream end of the hot water line 26 connects to a hot water supply 38, and an upstream end of the cold water line 28 connects to a cold water supply 40. A downstream end of the hot water line 26 connects to the electronic mixing valve 32, and more specifically, the hot water electronic valve 34. A downstream end of the cold water line 28 connects to the electronic mixing valve 32 and, more specifically, the cold water electronic valve 36. An upstream end of the mixed water line 30 connects to the electronic mixing valve 32. A downstream end of the mixed water line 30 connects to the discharge outlet 24. In the illustrated embodiments, at least a portion of the mixed water line 30 is the flexible hose 18. As stated above, the downstream end of the flexible hose 18 connects to the upstream end of the wand 20. Although the faucet 12 has been described as including a hot water electronic valve 34 and a cold water electronic valve 36, one of ordinary skill in the art will appreciate that the faucet 12 could include one or more electronic valves and/or the faucet 12 could include one or more mechanical valves in series or in parallel with the electronic valve(s).

In an exemplary embodiment, the hot water electronic valve 34 and the cold water electronic valve 36 are proportional valves and, more specifically, stepper motor actuated valves. However, one of ordinary skill in the art will appreciate that, in some embodiments, the electronic valves could be any type of electronic valves.

Further, in the illustrated embodiments, as best shown in FIGS. 1 and 2, the fitting 10 includes an activation sensor 42, such as a toggle sensor 44 and a presence sensor 46 of the faucet 12.

In an exemplary embodiment, the toggle sensor 44 is a proximity sensor and, in particular, an infrared sensor. The toggle sensor 44 is also referred to as a latching sensor and a sustained-flow sensor. In the illustrated embodiment, the toggle sensor 44 is mounted on an apex of the spout 16. The toggle sensor 44 defines a toggle zone. In an exemplary embodiment, the toggle sensor 44 is operable to activate the hot water electronic valve 34 and the cold water electronic valve 36 when an object enters the toggle zone and to deactivate the hot water electronic valve 34 and the cold water electronic valve 36 when the object exits and reenters the toggle zone. As used herein, an "object" can be any portion of a user's body or any item used by the user to trigger the toggle sensor 44. In an exemplary embodiment, the toggle zone extends generally upwardly from the toggle sensor 44. Additionally, in an exemplary embodiment, the toggle zone has a generally cone-like shape.

In an exemplary embodiment, the presence sensor 46 is a proximity sensor, and, in particular, an infrared sensor. The presence sensor 46 is also referred to as a quick-strike sensor. In the illustrated embodiment, the presence sensor 46 is mounted on the upstream end of the spout 16. The presence sensor 46 defines a presence zone. In an exemplary embodiment, the presence sensor 46 is operable to activate the hot water electronic valve 34 and the cold water electronic valve 36 when an object enters the presence zone and to deactivate the hot water electronic valve 34 and the cold water electronic valve 36 when the object exits the presence zone. Again, as used herein, an "object" can be any portion of a user's body or any item used by the user to trigger the presence sensor 46. In an exemplary embodiment, the presence zone extends generally horizontally from the presence sensor 46. Additionally, in an exemplary embodiment, the presence zone has a generally cone-like shape.

As described above, the toggle sensor 44 and the presence sensor 46 are proximity sensors and, in particular, infrared sensors. Proximity sensors are sensors that detect the presence of an object without any physical contact. However, one of ordinary skill in the art will appreciate that the toggle sensor 44 and the presence sensor 46 could be any type of electronic sensors that can be triggered, including, but not limited to, other proximity sensors, touch sensors, and image sensors. Exemplary electronic sensors include, but are not limited to, electromagnetic radiation sensors (such as optical sensors and radar sensors), capacitance sensors, inductance sensors, piezo-electric sensors, and multi-pixel optical sensors (such as camera sensors). Moreover, the toggle sensor 44 and the presence sensor 46 may not be the same type of sensor. As further described above, the toggle sensor 44 is mounted on the apex of the spout 16 and the presence sensor 46 is mounted on the upstream end of the spout 16. However, one of ordinary skill in the art will appreciate that the toggle sensor 44 and the presence sensor 46 could be mounted in any location on the faucet 12 or in a location remote from the faucet 12. Furthermore, the toggle sensor 44 and the presence sensor 46 may be located in close proximity to each other or fairly remote from each other.

Similarly, as described above, the sensors are a toggle sensor 44 and a presence sensor 46. However, one of ordinary skill in the art will appreciate that the toggle sensor 44 and the presence sensor 46 could be any type of sensors that provide information useful in determining whether to activate or deactivate the hot water electronic valve 34 and the cold water electronic valve 36, including, but not limited to, flow sensors, pressure sensors, temperature sensors, and position sensors. Moreover, the toggle sensor 44 and the presence sensor 46 may be the same type of sensor.

Further, in the illustrated embodiment, as best shown in FIG. 1, the fitting 10 includes a parameter sensor 48. In an exemplary embodiment, the parameter sensor 48 is operable to detect movement of the handle 22 and to provide information to set at least one parameter of water flowing through the hot water electronic valve 34 and the cold water electronic valve 36 based on the movement of the handle 22. The parameter sensor 48 is operable to detect movement of the handle 22 either directly or indirectly. In an exemplary embodiment, based on the movement of the handle 22, the parameter sensor 48 provides information to set a temperature and/or a volume of water flowing through the hot water electronic valve 34 and the cold water electronic valve 36.

In the illustrated embodiments, the handle 22 operates as it would with a standard faucet. In other words, the handle 22 can be moved between various positions to indicate a desired temperature and volume of water discharged from the faucet 12.

More specifically, with regard to the temperature of water, the handle 22 can be rotated about a longitudinal axis of the side opening in the hub 14. At one extent of a range of rotation, the position of the handle 22 indicates all hot water (a full hot position). At the other extent of the range of rotation, the position of the handle 22 indicates all cold water (a full cold position). In between the extents of the range of rotation, the position of the handle 22 indicates a mix of hot and cold water (mixed temperature positions) with hotter temperature water as the position nears the full hot extent of the range of rotation and colder temperature water as the position nears the full cold extent of the range of rotation.

With regard to the volume of water, the handle 22 can be moved toward and away from the side opening in the hub 14. At one extent of a range of movement, the position of the handle 22 indicates no volume of water (a full closed position). At the other extent of the range of movement, the position of the handle 22 indicates full volume of water (a full open position). In between the extents of the range of movement, the position of the handle 22 indicates an intermediate volume of water (less than full open positions) with reduced volume water as the position nears the full closed extent of the range of movement and increased volume water as the position nears the full open extent of the range of movement.

Additionally, in the illustrated embodiment, as best shown in FIG. 2, the electronic faucet 12 includes a flow module 50, an electronics module 52, and a power module 54. The flow module 50 includes a number of inlets and outlets and a number of flow passages. These inlets/outlets and flow passages enable the easy management of the flow between the incoming supplies (i.e., the hot water supply 38 and the cold water supply 40) and the wand 20. In the illustrated embodiment, the hot water electronic valve 34 and the cold water electronic valve 36 are located inside the flow module 50. The electronics module 52 includes a number of electronic components. These components enable the activation and deactivation of the hot water electronic valve 34 and the cold water electronic valve 36. In the illustrated embodiment, the electronics module 52 is connected to the flow module 50. The power module 54 provides electrical power to electronic components of the faucet 12.

Further, in the illustrated embodiment, as best shown in FIG. 1, the fitting 10 includes an electronic control 56. The electronic control 56 receives information (such as signals) from the toggle sensor 44 and the presence sensor 46 to activate and deactivate the hot water electronic valve 34 and the cold water electronic valve 36. Moreover, the electronic control 56 receives information (such as signals) from the parameter sensor 48 to set parameters (such as the temperature and the volume) of water flowing through the hot water electronic valve 34 and the cold water electronic valve 36. In an exemplary embodiment, at least a portion of the electronic control 56 is located inside the electronics module 52. Although the fitting 10 has been described as having a separate electronic control 56, one of ordinary skill in the art will appreciate that the electronic control 56 could be incorporated into the toggle sensor 44, the presence sensor 46, and/or the parameter sensor 48.

In an exemplary embodiment, as best shown in FIGS. 3a-3b and 5a-5g, the electronic mixing valve 32 includes the hot water electronic valve 34, the cold water electronic valve 36, and a housing 58. The housing 58 includes a hot water inlet 60, a cold water inlet 62, a hot water electronic valve chamber 64, a cold water electronic valve chamber 66, a mixing chamber 68, and an outlet 70. The hot water electronic valve 34 is operable to be received in the hot water electronic valve chamber 64, and the cold water electronic valve 36 is operable to be received in the cold water electronic valve chamber 66.

In an exemplary embodiment, the hot water electronic valve 34 and the cold water electronic valve 36 are the same type of valve, i.e., a proportional valve and, more specifically, a stepper motor actuated valve. The following description of the electronic valve applies to both the hot water electronic valve 34 and the cold water electronic valve 36.

In an exemplary embodiment, as best shown in FIGS. 3a-5g, the hot/cold water electronic valve 34/36 includes a stepper motor 72, an upper housing 74, a lower housing 76h/76c, a piston 78, a seat 80, and various sealing members 82, such as O-rings. The motor 72 includes a shaft 84.

In an exemplary embodiment, as best shown in FIGS. 5a-5g, the lower housing 76h/76c of the hot/cold water electronic valve 34/36 is integral with the housing 58 of the electronic mixing valve 32. However, one of ordinary skill in the art will appreciate that the lower housing 76h/76c of the hot/cold water electronic valve 34/36 could be separate from the housing 58 of the electronic mixing valve 32.

In an exemplary embodiment, as best shown in FIGS. 6a-6e, the piston 78 includes a body 86 and a nose 88. In the illustrated embodiment, the body 86 is generally cylindrical shaped. More specifically, the body 86 is a hexagonal prism. The body 86 includes a recess 90 that is operable to receive a portion of the shaft 84. In the illustrated embodiment, the nose 88 includes a sealing member groove 92, a first conical portion 94, a cylindrical portion 96, and a second conical portion 98. The sealing member groove 92 is operable to receive the sealing member 82, such as an O-ring. Although the nose 88 of the piston 78 has been described as including specific portions, one of ordinary skill in the art will appreciate that the nose 88 of the piston 78 does not need to include each of these portions. For example, the nose 88 of the piston 78 may not include a second conical portion 98.

In an exemplary embodiment, as best shown in FIGS. 7a-7e, the seat 80 includes a body 100 and a plurality of projections 102 extending therefrom. In the illustrated embodiment, the body 100 is generally cylindrical shaped. In the illustrated embodiment, the seat 80 includes four projections 102 extending from the body 100. The projections 102 are operable to connect the seat 80 to the lower housing 76h/76c. The body 100 includes a central opening 104 extending therethrough. In the illustrated embodiment, the central opening 104 in the body 100 includes an inlet portion 106, a first cylindrical portion 108, a conical portion 110, a second cylindrical portion 112, and an outlet portion 114. The nose 88 of the piston 78 is operable to be received in and move in and out of the central opening 104 in the seat 80. Although the central opening 104 in the seat 80 has been described as including specific portions, one of ordinary skill in the art will appreciate that the central opening 104 in the seat 80 does not need to include each of these portions. For example, the central opening 104 in the seat 80 may not include a first cylindrical portion 112 and an outlet portion 114.

Figure 6A:
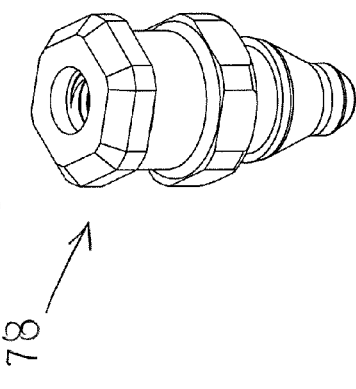
FIGS. 6a-6e include views of the piston of FIGS. 4a-4f, including a body and a nose, according to an exemplary embodiment of the present invention
Figure 6B:
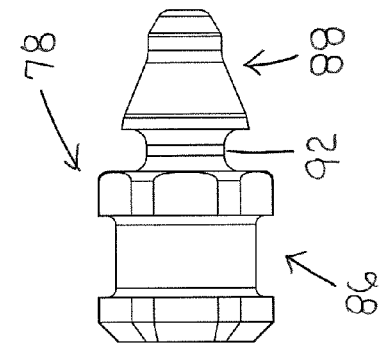
Figure 6E:
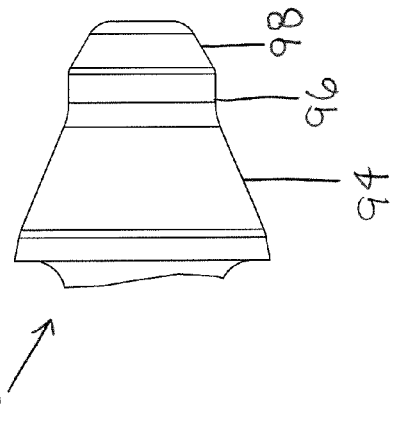
Figure 6C:
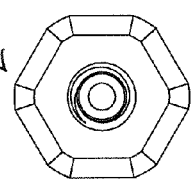
Figure 6D:
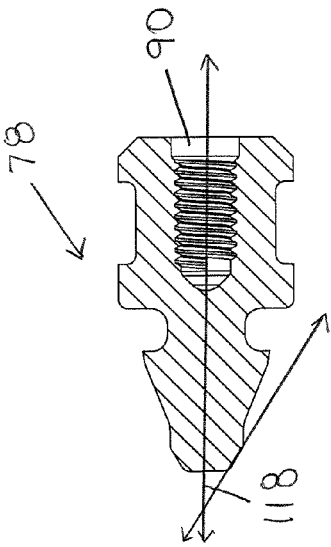
Figure 7A:
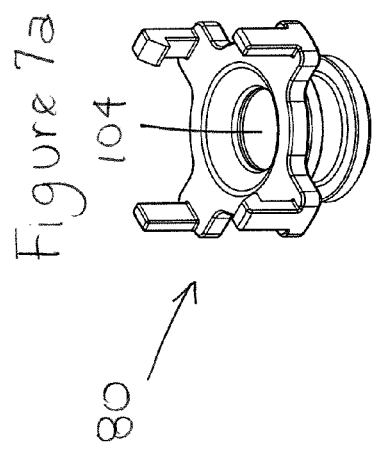
FIGS. 7a-7e include views of the seat of FIGS. 4a-4f, including a body and projections, according to an exemplary embodiment of the present invention
Figure 7B:
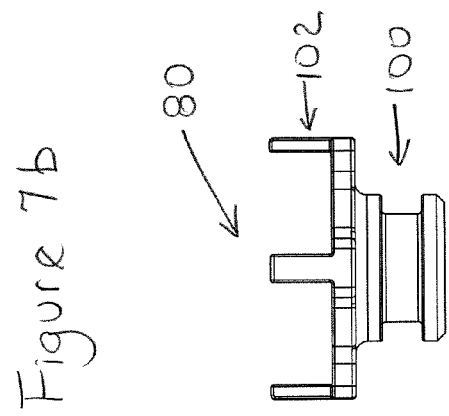
Figure 7C:
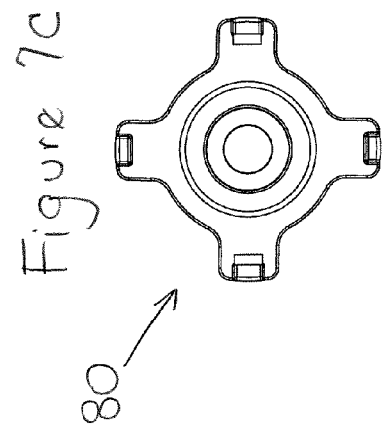
Figure 7D:
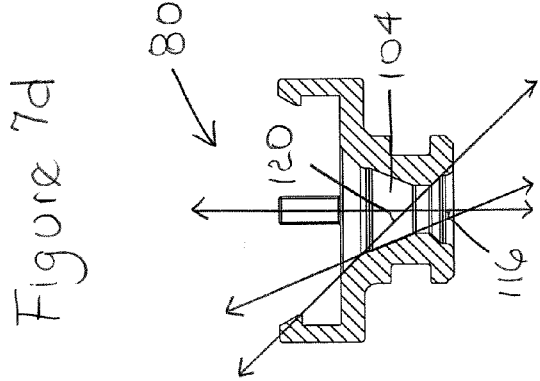
Figure 7E:
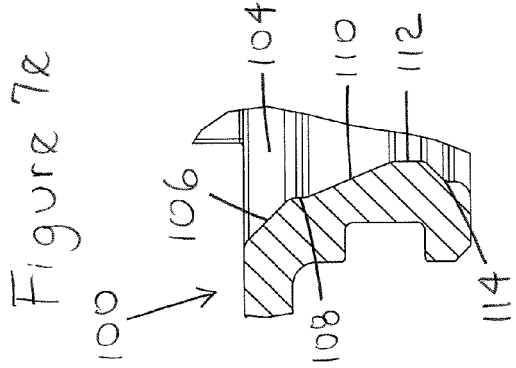
Figure 8A:
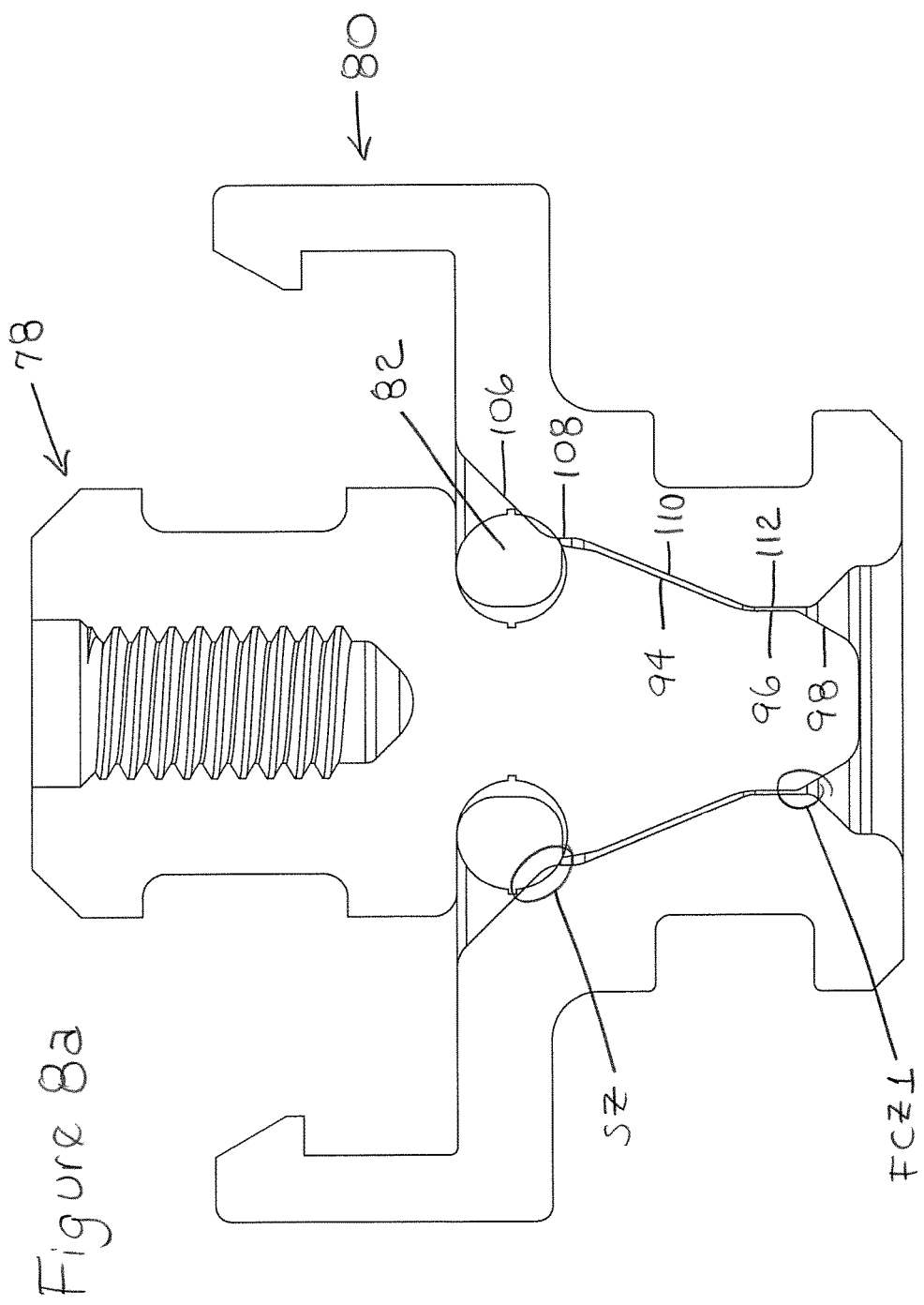
Figure 8B:
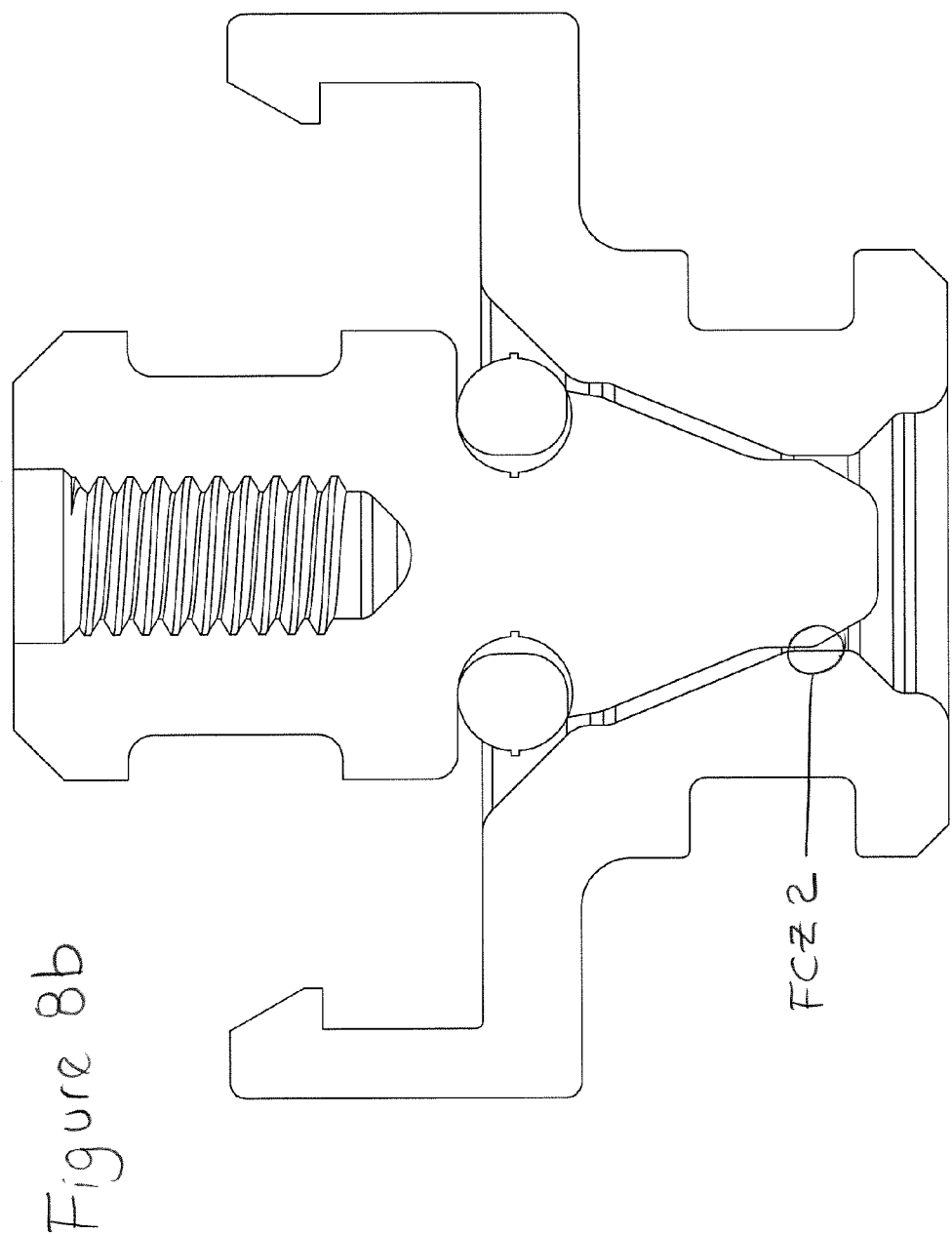
Figure 8A:
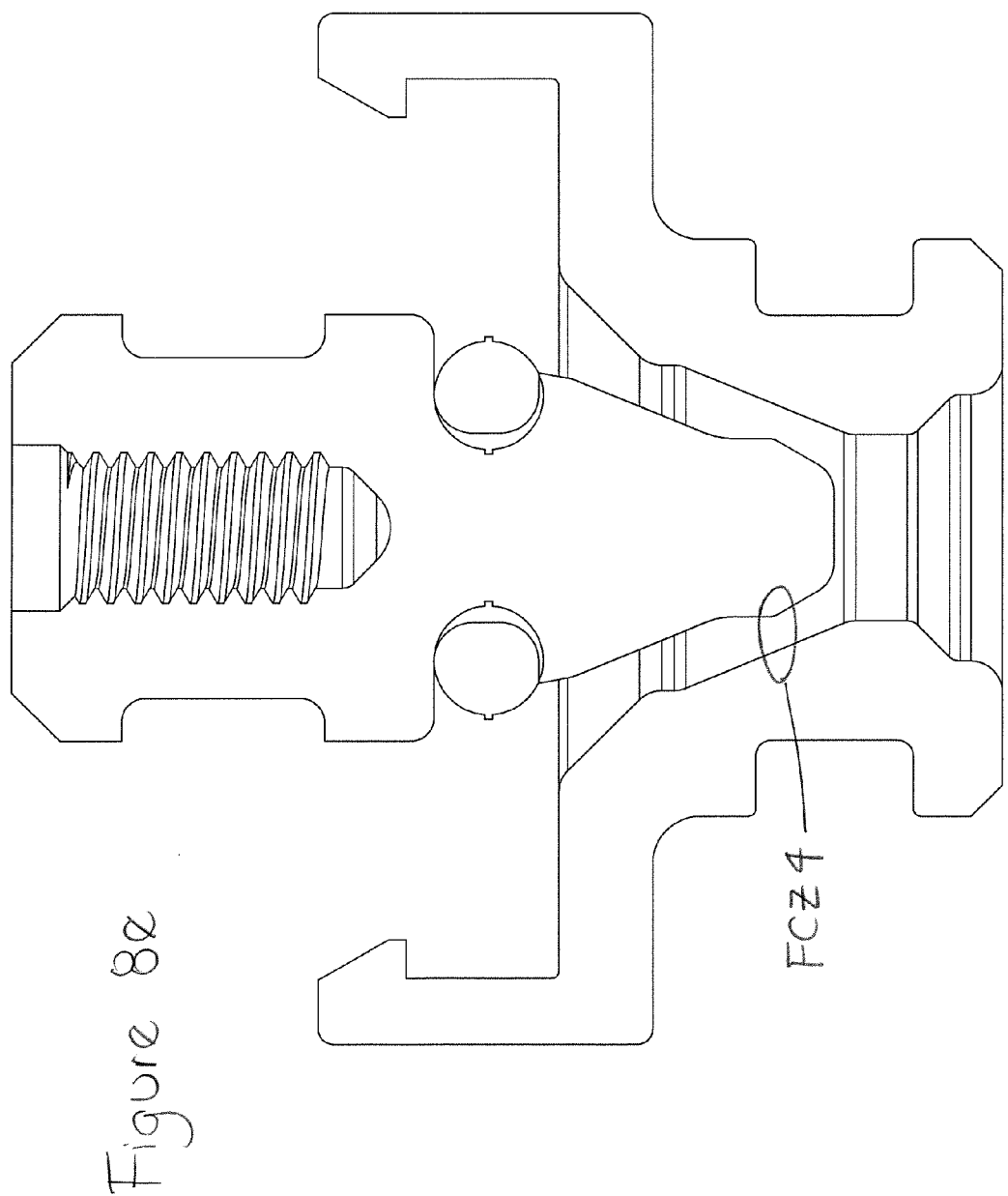
Figure 9A:
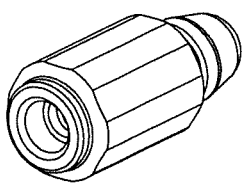
FIGS. 9a-9d include views of another embodiment of a piston, including a body and a nose, according to another exemplary embodiment of the present invention
Figure 9B:
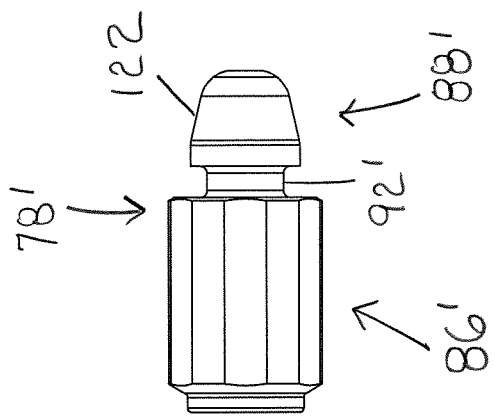
Figure 9C:
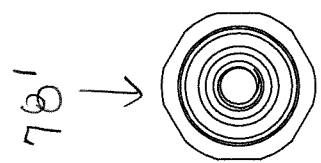
Figure 9D:
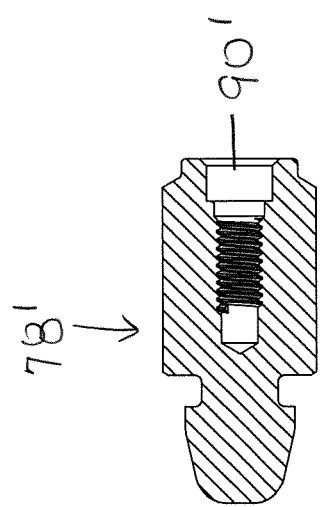
Figure 11A:
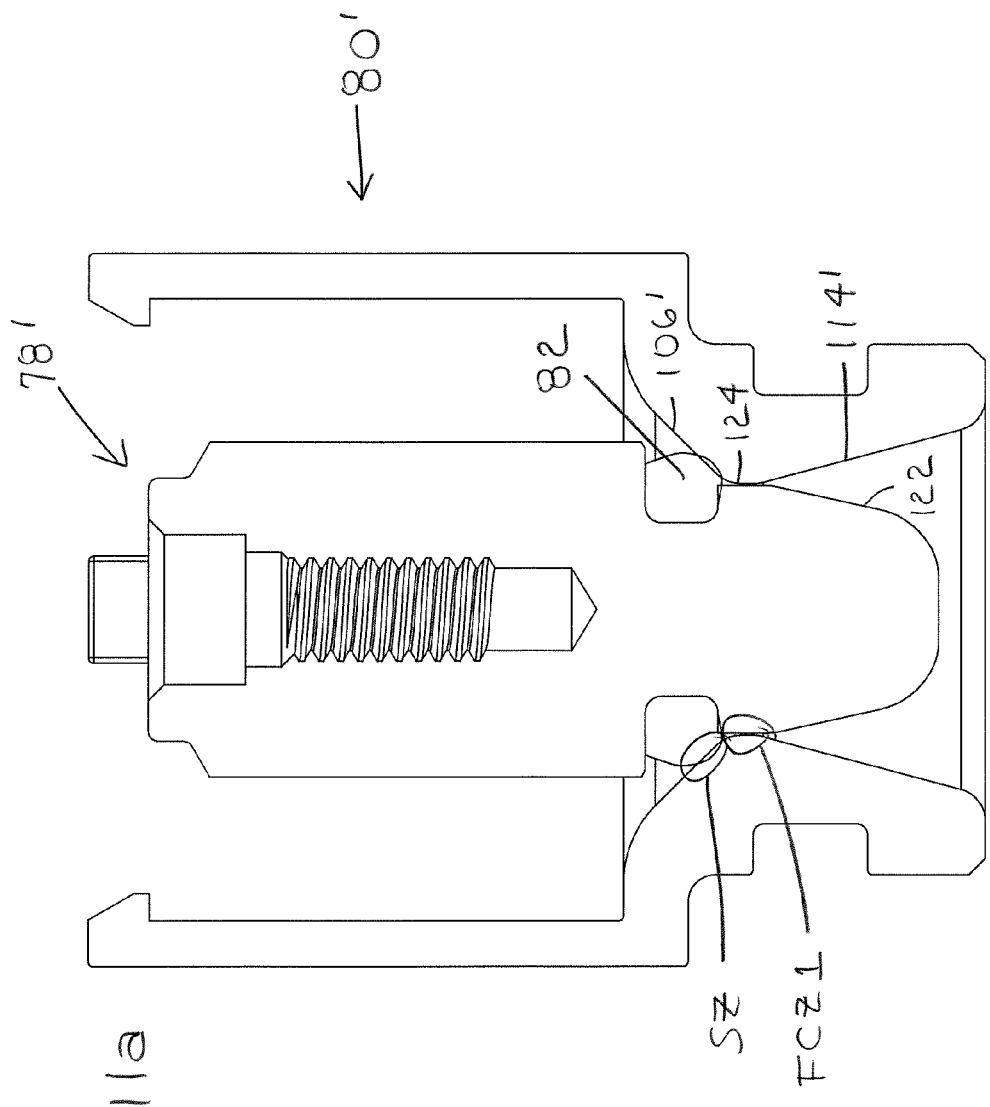
Figure 11B:
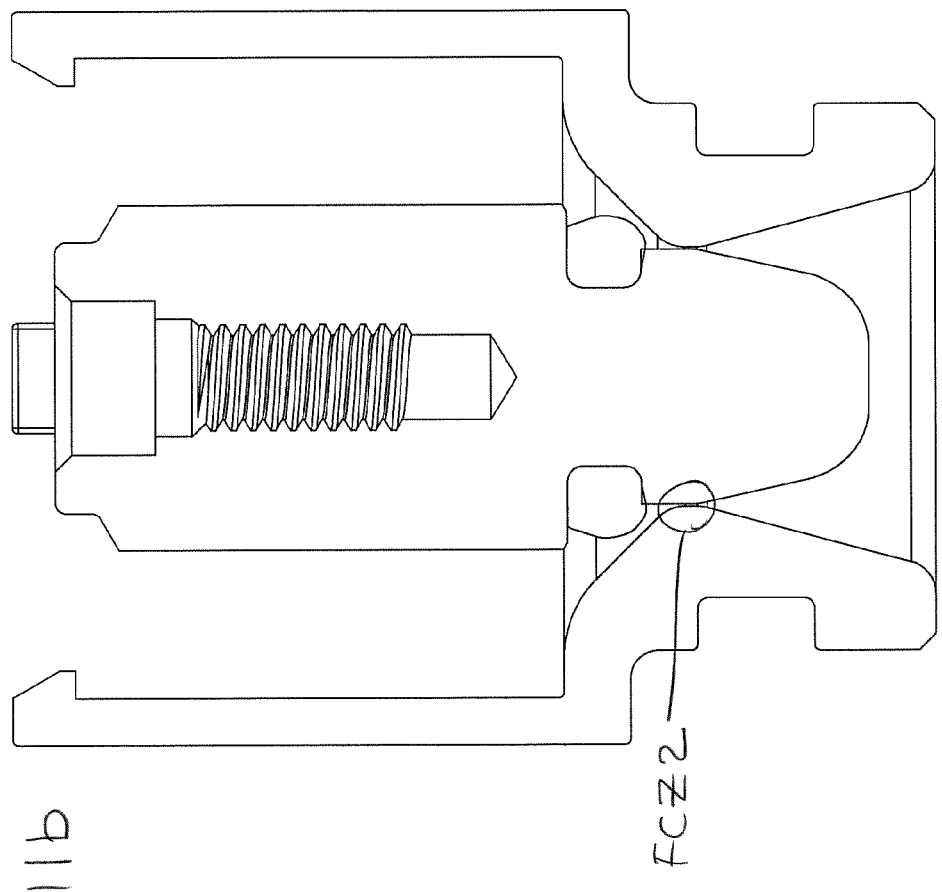
Figure 11C:
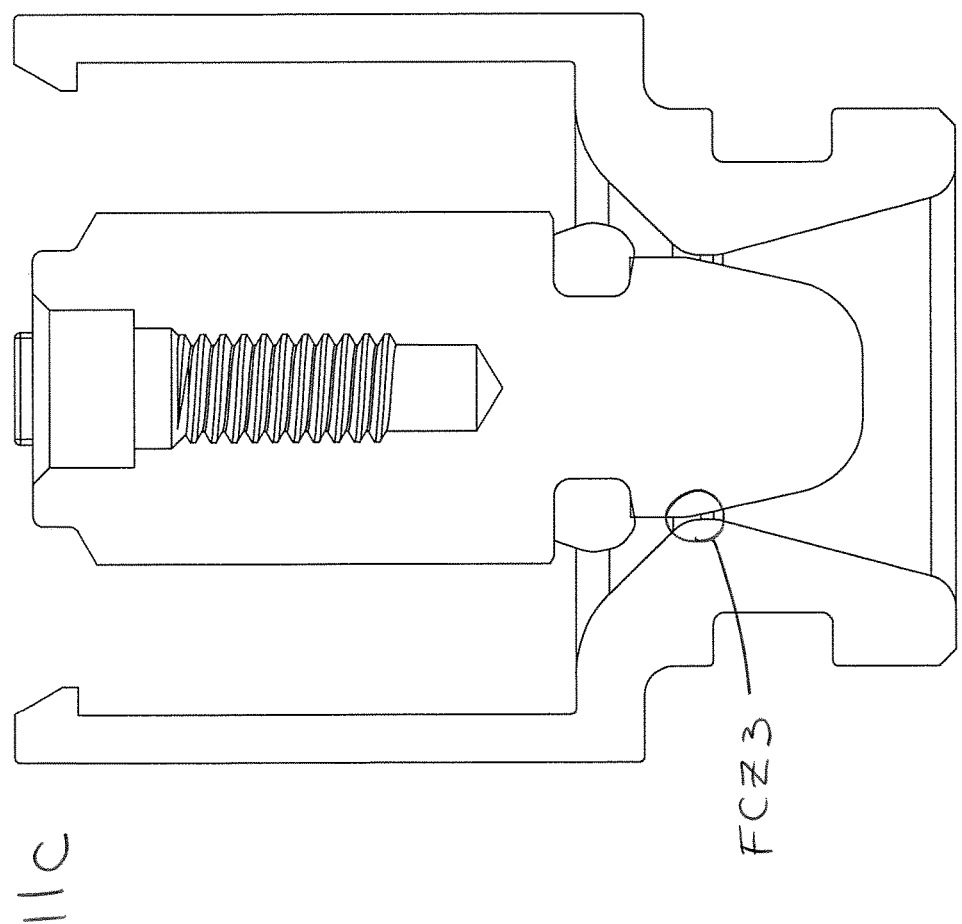
Figure 11D:
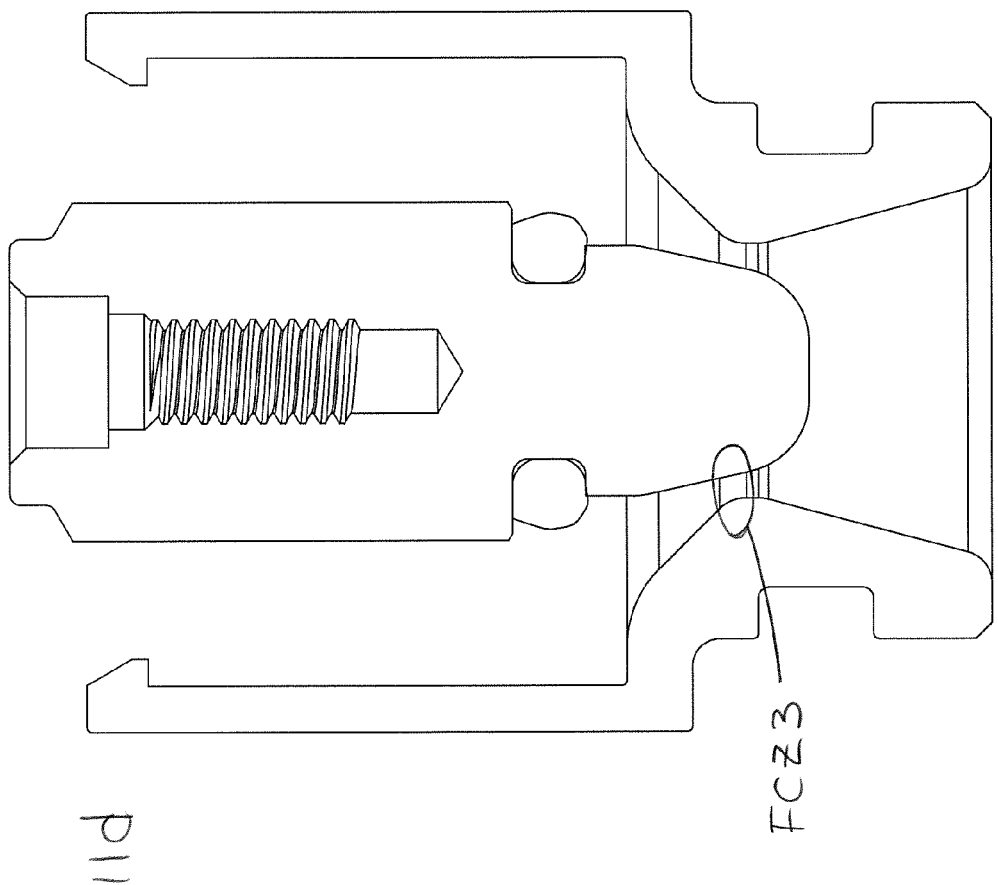
Figure 11A:
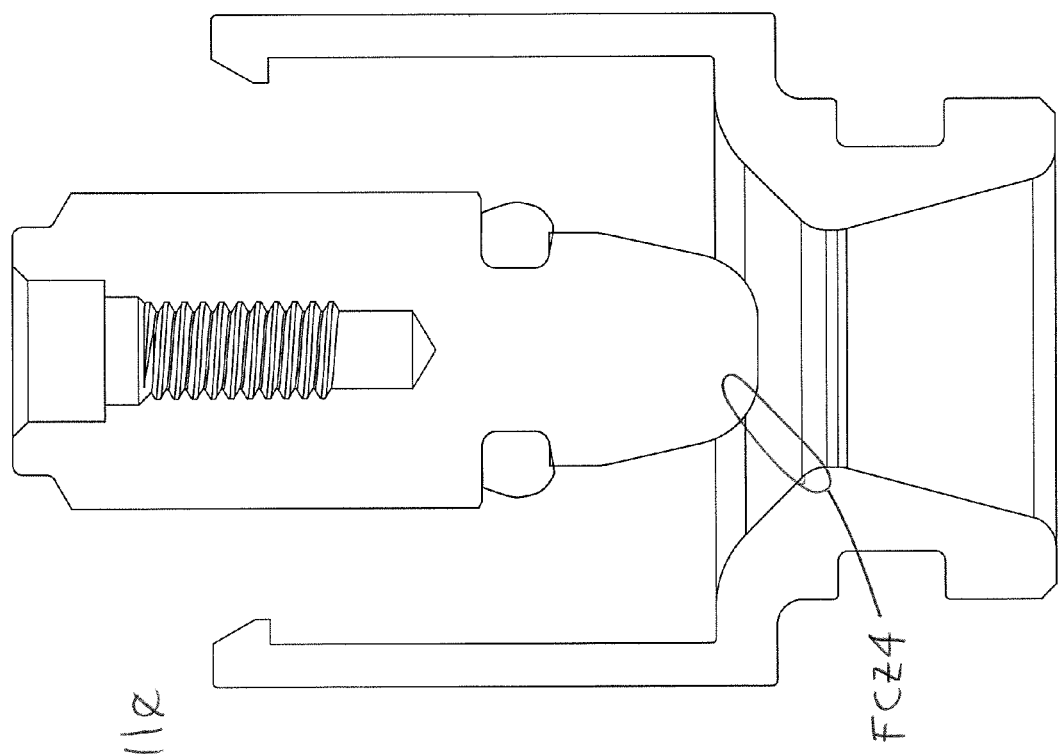

The conical portion 110 of the seat 80 has an angle 116, and the second conical portion 98 of the piston 78 has an angle 118. As best shown in FIG. 7d, the angle 116 of the conical portion 110 of the seat 80 is an angle between: (1) a central longitudinal axis of the seat 80, and (2) a line extending along the conical portion 110 of the seat 80. The central longitudinal axis of the seat 80 and the line extending along the conical portion 110 of the seat 80 extend in a common plane. As best shown in FIG. 6d, the angle 118 of the second conical portion 98 of the piston 78 is an angle between: (1) a central longitudinal axis of the piston 78, and (2) a line extending along the second conical portion 98 of the piston 78. The central longitudinal axis of the piston 78 and the line extending along the second conical portion 98 of the piston 78 extend in a common plane. In an exemplary embodiment, the angle 116 of the conical portion 110 of the seat 80 is less than the angle 118 of the second conical portion 98 of the piston 78. In the illustrated embodiment, the angle 116 of the conical portion 110 of the seat 80 is approximately twenty-two and one-half degrees (22.5°). In the illustrated embodiment, the angle 118 of the second conical portion 98 of the piston 78 is approximately thirty degrees (30°).

The inlet portion 106 of the seat 80 has an angle 120. As best shown in FIG. 7d, the angle 120 of the inlet portion 106 of the seat 80 is an angle between: (1) the central longitudinal axis of the seat 80, and (2) a line extending along the inlet portion 106 of the seat 80. The central longitudinal axis of the seat 80 and the line extending along the inlet portion 106 of the seat 80 extend in a common plane. In an exemplary embodiment, the angle 120 of the inlet portion 106 of the seat 80 is between approximately twenty-five degrees and seventy-five degrees (25°-75°). In an exemplary embodiment, the angle 120 of the inlet portion 106 of the seat 80 is between approximately thirty-five degrees and fifty-five degrees (35°-55°). In an exemplary embodiment, the angle 120 of the inlet portion 106 of the seat 80 is between approximately forty degrees and fifty degrees (40°-50°). In the illustrated embodiment, the angle 120 of the inlet portion 106 of the seat 80 is approximately forty-five degrees (45°).

In an exemplary embodiment, a geometry of the nose 88 of the piston 78 generally corresponds to a geometry of the central opening 104 in the seat 80. More specifically, in the illustrated embodiment, as best shown in FIGS. 8a-8e, a geometry of the first conical portion 94 and the cylindrical portion 96 of the piston 78 generally corresponds to a geometry of the conical portion 110 and the second cylindrical portion 112 of the seat 80. Even more specifically, opposing surfaces of the first conical portion 94 and the cylindrical portion 96 of the piston 78 and the conical portion 110 and the second cylindrical portion 112 of the seat 80 are generally parallel.

During operation of the hot/cold water electronic valve 34/36 including the piston 78 and the seat 80, as best shown in FIGS. 8a-8e, the hot/cold water electronic valve 34/36 moves from a completely closed position to a completely open position. In the completely closed position, no fluid flows through the hot/cold water electronic valve 34/36. In the completely open position, a maximum amount of fluid flows through the hot/cold water electronic valve 34/36. Between the completely closed position and the completely open position, an increasing amount of fluid flows through the hot/cold water electronic valve 34/36.

In the completely closed position, the sealing member 82 on the piston 78 is in sealing contact with the inlet portion 106 of the seat 80. Additionally, the first conical portion 94 and the cylindrical portion 96 of the piston 78 interface with the conical portion 110 and the second cylindrical portion 112 of the seat 80. As a result of the sealing contact between the sealing member 82 on the piston 78 and the inlet portion 106 of the seat 80, no fluid flows through the hot/cold water electronic valve 34/36.

As the piston 78 starts to move out of the seat 80, the sealing member 82 on the piston 78 loses sealing contact with the inlet portion 106 of the seat 80. Additionally, the first conical portion 94 and the cylindrical portion 96 of the piston 78 move away from the conical portion 110 and the second cylindrical portion 112 of the seat 80. As a result of the sealing member 82 on the piston 78 losing sealing contact with the inlet portion 106 of the seat 80, fluid starts to flow through the hot/cold water electronic valve 34/36.

As the piston 78 moves further out of the seat 80, the sealing member 82 on the piston 78 moves further away from the inlet portion 106 of the seat 80. Additionally, the first conical portion 94 and the cylindrical portion 96 of the piston 78 move further away from the conical portion 110 and the second cylindrical portion 112 of the seat 80. As a result, an increasing amount of fluid flows through the hot/cold water electronic valve 34/36.

In the completely open position, the sealing member 82 on the piston 78 is furthest away from the inlet portion 106 of the seat 80. Additionally, the first conical portion 94 and the cylindrical portion 96 of the piston 78 are furthest away from the conical portion 110 and the second cylindrical portion 112 of the seat 80. As a result, the maximum amount of fluid flows through the hot/cold water electronic valve 34/36.

In the illustrated embodiment, as best shown in FIGS. 8a-8e, the hot/cold water electronic valve 34/36 has a sealing zone SZ. The sealing zone SZ is static. The sealing zone SZ is a region where the sealing member 82 on the piston 78 interfaces with the inlet portion 106 of the seat 80. More specifically, the sealing zone SZ is the region where the sealing member 82 on the piston 78 is in contact with the inlet portion 106 of the seat 80. As stated above, when the sealing member 82 on the piston 78 is in contact with the inlet portion 106 of the seat 80, the hot/cold water electronic valve 34/36 is sealed and no fluid flows through the hot/cold water electronic valve 34/36. When the sealing member 82 on the piston 78 is not in contact with the inlet portion 106 of the seat 80, the hot/cold water electronic valve 34/36 is not sealed and a varying amount of fluid flows through the hot/cold water electronic valve 34/36 (depending on the position of the piston 78 relative to the seat 80).

In the illustrated embodiment, as best shown in FIGS. 8a-8e, the hot/cold water electronic valve 34/36 also has a flow control zone FCZ. The flow control zone FCZ is dynamic. At any given position of the piston 78 relative to the seat 80, the flow control zone FCZ is a region where the downstream end of the cylindrical portion 96 of the piston 78 interfaces with the seat 80. More specifically, the flow control zone FCZ is the region where the downstream end of the cylindrical portion 96 of the piston 78 is at a minimum distance from the seat 80. In the completely closed position, the downstream end of the cylindrical portion 96 of the piston 78 interfaces with the downstream end of the second cylindrical portion 112 of the seat 80. As the hot/cold water electronic valve 34/36 opens, the downstream end of the cylindrical portion 96 of the piston 78 interfaces with the second cylindrical portion 112 of the seat 80 and then the conical portion 110 of the seat 80. In the completely open position, the downstream end of the cylindrical portion 96 of the piston 78 interfaces with the conical portion 110 of the seat 80.

In an exemplary embodiment, as best shown in FIGS. 8a-8e, the sealing zone SZ is separate from the flow control zone FCZ. In an exemplary embodiment, as best shown in FIGS. 8a-8e, the sealing zone SZ is upstream of the flow control zone. More specifically, when the hot/cold water electronic valve 34/36 is completely closed, the sealing zone SZ is separate from and upstream of the flow control zone FCZ1 (see FIG. 8a); as the hot/cold water electronic valve 34/36 opens, the sealing zone SZ is separate from and upstream of the flow control zone FCZ2 (see FIG. 8b); as the hot/cold water electronic valve 34/36 further opens, the sealing zone SZ is separate from and upstream of the flow control zone FCZ3 (the flow control zone FCZ3 moves upstream along the second cylindrical portion 112 and then the conical portion 110 of the seat 80 as the hot/cold water electronic valve 34/36 further opens) (see FIGS. 8c and 8d); and when the hot/cold water electronic valve 34/36 is completely open, the sealing zone SZ is separate from and upstream of the flow control zone FCZ4 (see FIG. 8e).

Although the hot/cold water electronic valve 34/36 has been described as having a sealing zone SZ where the sealing member 82 on the piston 78 interfaces with the inlet portion 106 of the seat 80, one of ordinary skill in the art will appreciate that the sealing member 82 could be on the seat 80 and interface with the nose 88 of the piston 78. Additionally, although the hot/cold water electronic valve 34/36 has been described as including a sealing member 82, such as an O-ring, in the sealing member groove 92 on the piston 78, one of ordinary skill in the art will appreciate that the sealing member 82 could be integrally formed with the piston 78 (or the seat 80 if the sealing member 82 is on the seat 80). Further, one of ordinary skill in the art will appreciate that the piston 78 (or the seat 80 if the sealing member 82 is on the seat 80) does not need to include a sealing member groove 92.

In an exemplary embodiment, the hot/cold water electronic valve 34/36 including the piston 78 and the seat 80 has a sealing zone. The sealing zone is static. The sealing zone is a region where a sealing member 82 on one of the piston 78 and the seat 80 interfaces with the other of the piston 78 and the seat 80. More specifically, the sealing zone is the region where the sealing member 82 on one of the piston 78 and the seat 80 is in contact with the other of the piston 78 and the seat 80. When the sealing member 82 on one of the piston 78 and the seat 80 is in contact with the other of the piston 78 and the seat 80, the hot/cold water electronic valve 34/36 is sealed and no fluid flows through the hot/cold water electronic valve 34/36. When the sealing member 82 on one of the piston 78 and the seat 80 is not in contact with the other of the piston 78 and the seat 80, the hot/cold water electronic valve 34/36 is not sealed and a varying amount of fluid flows through the hot/cold water electronic valve 34/36 (depending on the position of the piston 78 relative to the seat 80).

In an exemplary embodiment, the hot/cold water electronic valve 34/36 including the piston 78 and the seat 80 has a flow control zone. The flow control zone is dynamic. At any given position of the piston 78 relative to the seat 80, the flow control zone is a region where a portion of the piston 78 interfaces with a portion of the seat 80. More specifically, the flow control zone is the region where the portion of the piston 78 is at a minimum distance from the portion of the seat 80. Even more specifically, the flow control zone is the region where a distance between the portion of the piston 78 and the portion of the seat 80 is less than a distance between any other portion of the piston 78 and any other portion of the seat 80.

In another exemplary embodiment, as best shown in FIGS. 9a-9d, the piston 78' includes a body 86' and a nose 88'. In the illustrated embodiment, the body 86' is generally cylindrical shaped. More specifically, the body 86' is a hexagonal prism. The body 86' includes a recess 90' that is operable to receive a portion of the shaft 84. In the illustrated embodiment, the nose 88' includes a sealing member groove 92' and a dome-shaped portion 122. The sealing member groove 92' is operable to receive the sealing member 82, such as an O-ring.

In another exemplary embodiment, as best shown in FIGS. 10a-10d, the seat 80' includes a body 100' and a plurality of projections 102' extending therefrom. In the illustrated embodiment, the body 100' is generally cylindrical shaped. In the illustrated embodiment, the seat 80' includes four projections 102' extending from the body 100'. The projections 102' are operable to connect the seat 80' to the lower housing 76h/76c. The body 100' includes a central opening 104' extending therethrough. In the illustrated embodiment, the central opening 104' in the body 100' includes an inlet portion 106', a rounded portion 124, and an outlet portion 114'. The nose 88' of the piston 78' is operable to be received in and move in and out of the central opening 104' in the seat 80'. Although the central opening 104' in the seat 80' has been described as including specific portions, one of ordinary skill in the art will appreciate that the central opening 104' in the seat 80' does not need to include each of these portions. For example, the central opening 104' in the seat 80' may not include an outlet portion 114'.

During operation of the hot/cold water electronic valve 34/36 including the piston 78' and the seat 80', as best shown in FIGS. 11a-11e, the hot/cold water electronic valve 34/36 moves from a completely closed position to a completely open position. In the completely closed position, no fluid flows through the hot/cold water electronic valve 34/36. In the completely open position, a maximum amount of fluid flows through the hot/cold water electronic valve 34/36. Between the completely closed position and the completely open position, an increasing amount of fluid flows through the hot/cold water electronic valve 34/36.

In the completely closed position, the sealing member 82 on the piston 78' is in sealing contact with the inlet portion 106' of the seat 80'. Additionally, the dome-shaped portion 122 of the piston 78' interfaces with the rounded portion 124 of the seat 80'. As a result of the sealing contact between the sealing member 82 on the piston 78' and the inlet portion 106' of the seat 80', no fluid flows through the hot/cold water electronic valve 34/36.

As the piston 78' starts to move out of the seat 80', the sealing member 82 on the piston 78' loses sealing contact with the inlet portion 106' of the seat 80'. Additionally, the dome-shaped portion 122 of the piston 78' moves along the rounded portion 124 of the seat 80'. As a result of the sealing member 82 on the piston 78' losing sealing contact with the inlet portion 106' of the seat 80', fluid starts to flow through the hot/cold water electronic valve 34/36.

As the piston 78' moves further out of the seat 80', the sealing member 82 on the piston 78' moves further away from the inlet portion 106' of the seat 80'. Additionally, the dome-shaped portion 122 of the piston 78' moves further away from the rounded portion 124 of the seat 80'. As a result, an increasing amount of fluid flows through the hot/cold water electronic valve 34/36.

In the completely open position, the sealing member 82 on the piston 78' is furthest away from the inlet portion 106' of the seat 80'. Additionally, the dome-shaped portion 122 of the piston 78' is furthest away from the rounded portion 124 of the seat 80'. As a result, the maximum amount of fluid flows through the hot/cold water electronic valve 34/36.

In the illustrated embodiment, as best shown in FIGS. 11a-11e, the hot/cold water electronic valve 34/36 has a sealing zone SZ. The sealing zone SZ is static. The sealing zone SZ is a region where the sealing member 82 on the piston 78' interfaces with the inlet portion 106' of the seat 80'. More specifically, the sealing zone SZ is the region where the sealing member 82 on the piston 78' is in contact with the inlet portion 106' of the seat 80'. As stated above, when the sealing member 82 on the piston 78' is in contact with the inlet portion 106' of the seat 80', the hot/cold water electronic valve 34/36 is sealed and no fluid flows through the hot/cold water electronic valve 34/36. When the sealing member 82 on the piston 78' is not in contact with the inlet portion 106' of the seat 80', the hot/cold water electronic valve 34/36 is not sealed and a varying amount of fluid flows through the hot/cold water electronic valve 34/36 (depending on the position of the piston 78' relative to the seat 80').

In the illustrated embodiment, as best shown in FIGS. 11a-11e, the hot/cold water electronic valve 34/36 also has a flow control zone FCZ. The flow control zone is dynamic. At any given position of the piston 78' relative to the seat 80', the flow control zone FCZ is a region where the dome-shaped portion 122 of the piston 78' interfaces with the seat 80'. More specifically, the flow control zone FCZ is the region where the dome-shaped portion 122 of the piston 78' is at a minimum distance from the seat 80'. In the completely closed position, the dome-shaped portion 122 of the piston 78' interfaces with the rounded portion 124 of the seat 80'. As the hot/cold water electronic valve 34/36 opens, the dome-shaped portion 122 of the piston 78' moves along the rounded portion 124 of the seat 80'. In the completely open position, the dome-shaped portion 122 of the piston 78' is furthest away from the rounded portion 124 of the seat 80'.

In an exemplary embodiment, as best shown in FIGS. 11a-11e, the sealing zone SZ is separate from the flow control zone FCZ. In an exemplary embodiment, as best shown in FIGS. 11a-11e, the sealing zone SZ is upstream of the flow control zone FCZ. More specifically, when the hot/cold water electronic valve 34/36 is completely closed, the sealing zone SZ is separate from and upstream of the flow control zone FCZ1 (see FIG. 11a); as the hot/cold water electronic valve 34/36 opens, the sealing zone SZ is separate from and upstream of the flow control zone FCZ2 (see FIG. 11b); as the hot/cold water electronic valve 34/36 further opens, the sealing zone SZ is separate from and upstream of the flow control zone FCZ3 (the flow control zone FCZ3 moves upstream along the rounded portion 124 of the seat 80' as the hot/cold water electronic valve 34/36 further opens) (see FIGS. 11c and 11d); and when the hot/cold water electronic valve 34/36 is completely open, the sealing zone SZ is separate from and upstream of the flow control zone FCZ4 (see FIG. 11e).

Although the hot/cold water electronic valve 34/36 has been described as having a sealing zone SZ where the sealing member 82 on the piston 78' interfaces with the inlet portion 106' of the seat 80', one of ordinary skill in the art will appreciate that the sealing member 82 could be on the seat 80' and interface with the nose 88' of the piston 78'. Additionally, although the hot/cold water electronic valve 34/36 has been described as including a sealing member 82, such as an O-ring, in the sealing member groove 92' on the piston 78', one of ordinary skill in the art will appreciate that the sealing member 82 could be integrally formed with the piston 78' (or the seat 80' if the sealing member 82 is on the seat 80'). Further, one of ordinary skill in the art will appreciate that the piston 78' (or the seat 80' if the sealing member 82 is on the seat 80') does not need to include a sealing member groove 92'.

In an exemplary embodiment, the hot/cold water electronic valve 34/36 including the piston 78' and the seat 80' has a sealing zone. The sealing zone is static. The sealing zone is a region where a sealing member 82 on one of the piston 78' and the seat 80' interfaces with the other of the piston 78' and the seat 80'. More specifically, the sealing zone is the region where the sealing member 82 on one of the piston 78' and the seat 80' is in contact with the other of the piston 78' and the seat 80'. When the sealing member 82 on one of the piston 78' and the seat 80' is in contact with the other of the piston 78' and the seat 80', the hot/cold water electronic valve 34/36 is sealed and no fluid flows through the hot/cold water electronic valve 34/36. When the sealing member 82 on one of the piston 78' and the seat 80' is not in contact with the other of the piston 78' and the seat 80', the hot/cold water electronic valve 34/36 is not sealed and a varying amount of fluid flows through the hot/cold water electronic valve 34/36 (depending on the position of the piston 78' relative to the seat 80').

In an exemplary embodiment, the hot/cold water electronic valve 34/36 including the piston 78' and the seat 80' has a flow control zone. The flow control zone is dynamic. At any given position of the piston 78' relative to the seat 80', the flow control zone is a region where a portion of the piston 78' interfaces with a portion of the seat 80'. More specifically, the flow control zone is the region where the portion of the piston 78' is at a minimum distance from the portion of the seat 80'. Even more specifically, the flow control zone is the region where a distance between the portion of the piston 78' and the portion of the seat 80' is less than a distance between any other portion of the piston 78' and any other portion of the seat 80'.

Although the electronic plumbing fixture fitting 10 has been described as including an electronic mixing valve 32 and the electronic mixing valve 32 has been described as including a hot water electronic valve 34 and a cold water electronic valve 36, one of ordinary skill in the art will appreciate that the electronic valve could be used as a shutoff valve in addition to or in place of the mixing valve. Additionally, when the electronic valve is used as a shutoff valve, the seat 80/80' could be integrated into the valve housing.

Figure 12A:
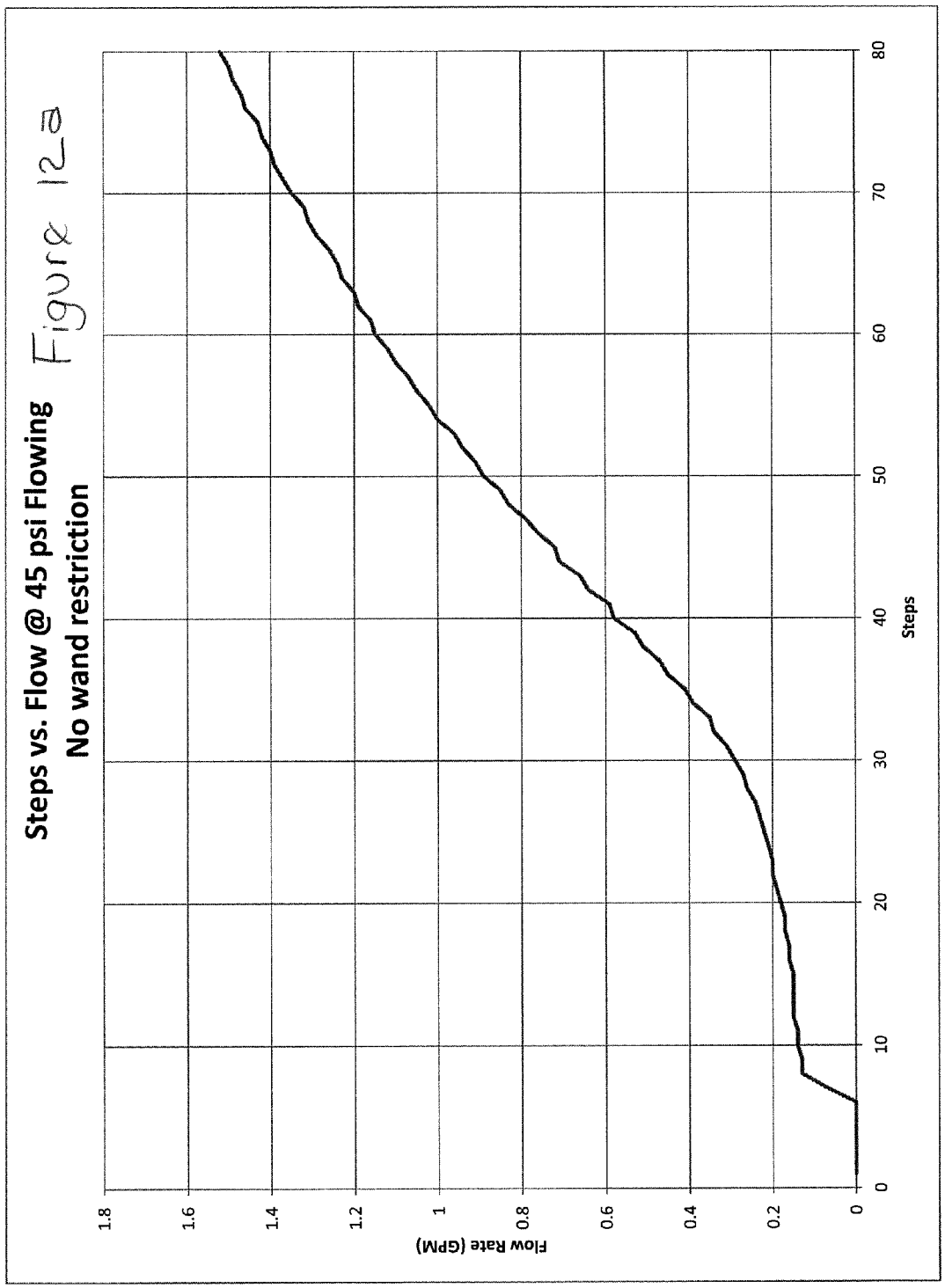

During operation of the hot/cold water electronic valve 34/36 including the piston 78 and the seat 80, as best shown in FIGS. 12a and 12b, a flow rate through the hot/cold water electronic valve 34/36 generally increases with each step of the motor 72. In this embodiment, a maximum number of steps provided by the motor 72 is eighty (80) steps. As a result, a first twenty-five percent (25%) of the maximum number of steps provided by the motor 72 is a first twenty (20) steps. With a supply line pressure of approximately forty-five pounds per square inch (45 psi) and no restriction on the flow downstream of the valve, a maximum flow rate through the hot/cold water electronic valve 34/36 at the maximum number of steps is approximately one and one-half gallons per minute (1.5 gpm). As a result, twenty-five percent (25%) of the maximum flow rate provided by the hot/cold water electronic valve 34/36 is approximately three-hundred seventy-five thousandths gallons per minute (0.375 gpm), twenty percent (20%) of the maximum flow rate provided by the hot/cold water electronic valve 34/36 is approximately three-tenths gallons per minute (0.3 gpm), and fifteen percent (15%) of the maximum flow rate provided by the hot/cold water electronic valve 34/36 is approximately two-hundred twenty-five thousandths gallons per minute (0.225 gpm).

During operation of the hot/cold water electronic valve 34/36 including the piston 78 and the seat 80, with a supply line pressure of approximately forty-five pounds per square inch (45 psi) and no restriction on the flow downstream of the valve, for the first twenty-five percent (25%) of the maximum number of steps provided by the motor 72, the flow rate through the hot/cold water electronic valve 34/36 does not exceed approximately twenty-five percent (25%) of the maximum flow rate provided by the hot/cold water electronic valve 34/36. In another exemplary embodiment, with a supply line pressure of approximately forty-five pounds per square inch (45 psi) and no restriction on the flow downstream of the valve, for the first twenty-five percent (25%) of the maximum number of steps provided by the motor 72, the flow rate through the hot/cold water electronic valve 34/36 does not exceed approximately twenty percent (20%) of the maximum flow rate provided by the hot/cold water electronic valve 34/36. In another exemplary embodiment, with a supply line pressure of approximately forty-five pounds per square inch (45 psi) and no restriction on the flow downstream of the valve, for the first twenty-five percent (25%) of the maximum number of steps provided by the motor 72, the flow rate through the hot/cold water electronic valve 34/36 does not exceed approximately fifteen percent (15%) of the maximum flow rate provided by the hot/cold water electronic valve 34/36.

During operation of the hot/cold water electronic valve 34/36 including the piston 78 and the seat 80, with a supply line pressure of approximately forty-five pounds per square inch (45 psi) and no restriction on the flow downstream of the valve, for the first twenty-five percent (25%) of the maximum number of steps provided by the motor 72, the flow rate through the hot/cold water electronic valve 34/36 does not exceed approximately six tenths gallons per minute (0.6 gpm). In another exemplary embodiment, with a supply line pressure of approximately forty-five pounds per square inch (45 psi) and no restriction on the flow downstream of the valve, for the first twenty-five percent (25%) of the maximum number of steps provided by the motor 72, the flow rate through the hot/cold water electronic valve 34/36 does not exceed approximately five tenths gallons per minute (0.5 gpm). In another exemplary embodiment, with a supply line pressure of approximately forty-five pounds per square inch (45 psi) and no restriction on the flow downstream of the valve, for the first twenty-five percent (25%) of the maximum number of steps provided by the motor 72, the flow rate through the hot/cold water electronic valve 34/36 does not exceed approximately four tenths gallons per minute (0.4 gpm). In another exemplary embodiment, with a supply line pressure of approximately forty-five pounds per square inch (45 psi) and no restriction on the flow downstream of the valve, for the first twenty-five percent (25%) of the maximum number of steps provided by the motor 72, the flow rate through the hot/cold water electronic valve 34/36 does not exceed approximately three tenths gallons per minute (0.3 gpm). In another exemplary embodiment, with a supply line pressure of approximately forty-five pounds per square inch (45 psi) and no restriction on the flow downstream of the valve, for the first twenty-five percent (25%) of the maximum number of steps provided by the motor 72, the flow rate through the hot/cold water electronic valve 34/36 does not exceed approximately two tenths gallons per minute (0.2 gpm).

During operation of the hot/cold water electronic valve 34/36 including the piston 78' and the seat 80', as best shown in FIGS. 13a and 13b, a flow rate through the hot/cold water electronic valve 34/36 generally increases with each step of the motor 72. In this embodiment, a maximum number of steps provided by the motor 72 is two-hundred fifty (250) steps. As a result, a middle seventy percent (70%) of the maximum number of steps provided by the motor 72 is a middle one-hundred seventy-five (175) steps (from step 38 to step 210 which will be approximated as step 40 to step 215 for purposes of any flow rate calculations). With a supply line pressure of approximately forty-five pounds per square inch (45 psi) and no restriction on the flow downstream of the valve, a maximum flow rate through the hot/cold water electronic valve 34/36 at the maximum number of steps is approximately nine and one-half gallons per minute (9.5 gpm).

During operation of the hot/cold water electronic valve 34/36 including the piston 78' and the seat 80', with a supply line pressure of approximately forty-five pounds per square inch (45 psi) and no restriction on the flow downstream of the valve, for the middle seventy percent (70%) of the maximum number of steps provided by the motor 72, an average rate of change in the flow rate through the hot/cold water electronic valve 34/36 is in a range of approximately ten thousandths gallons per minute per step (0.010 gpm/step) and sixteen hundredths gallons per minute per step (0.16 gpm/step). In another exemplary embodiment, with a supply line pressure of approximately forty-five pounds per square inch (45 psi) and no restriction on the flow downstream of the valve, for the middle seventy percent (70%) of the maximum number of steps provided by the motor 72, the average rate of change in the flow rate through the hot/cold water electronic valve 34/36 is in a range of approximately twenty thousandths gallons per minute per step (0.020 gpm/step) and eighty thousandths gallons per minute per step (0.080 gpm/step). In the illustrated embodiment, with a supply line pressure of approximately forty-five pounds per square inch (45 psi) and no restriction on the flow downstream of the valve, for the middle seventy percent (70%) of the maximum number of steps provided by the motor 72, the average rate of change in the flow rate through the hot/cold water electronic valve 34/36 is approximately forty-two thousandths gallons per minute per step (0.042 gpm/step).

One of ordinary skill in the art will now appreciate that the present invention provides an electronic plumbing fixture fitting with an electronic valve including a piston and a seat, such as an electronic faucet with an electronic valve including a piston and a seat. Although the present invention has been shown and described with reference to particular embodiments, equivalent alterations and modifications will occur to those skilled in the art upon reading and understanding this specification. The present invention includes all such equivalent alterations and modifications and is limited only by the scope of the following claims in light of their full scope of equivalents.

What is claimed is:

1. An electronic plumbing fixture fitting, comprising:
    a discharge outlet, the discharge outlet being operable to deliver water; and
    an electronic valve, the electronic valve being operable to permit flow of water through the discharge outlet when the electronic valve is activated and to not permit flow of water through the discharge outlet when the electronic valve is deactivated, the electronic valve including a piston and a seat;
    the piston including a body and a nose;
    the seat including a body, the body including a central opening extending therethrough;
    the electronic valve having a sealing zone, the sealing zone being a region where a sealing member on one of the piston and the seat is in sealing contact with the other of the piston and the seat, the sealing zone being static;
    the electronic valve having a flow control zone, at any given position of the piston relative to the seat, the flow control zone being a region where: (1) a portion of the piston interfaces with a portion of the seat, and (2) a distance between the portion of the piston and the portion of the seat is less than a distance between any other portion of the piston and any other portion of the seat, the flow control zone being dynamic;
    wherein, the portion of the piston in the flow control zone is static, and the portion of the seat in the flow control zone is dynamic;
    wherein, when the electronic valve is in a completely closed position, the sealing zone is pressurized, but the flow control zone is not pressurized; and
    wherein, as the electronic valve moves from: (1) a position where: (a) the sealing member on one of the piston and the seat has lost sealing contact with the other of the piston and the seat, and (b) a distance between the sealing member on one of the piston and the seat and the other of the piston and the seat is greater than the distance between the portion of the piston and the portion of the seat in the flow control zone through: (2) a completely open position, the sealing zone is separate from the flow control zone.

2. The electronic plumbing fixture fitting of claim 1, wherein the sealing zone is upstream of the flow control zone.

3. An electronic plumbing fixture fitting, comprising:
    a discharge outlet, the discharge outlet being operable to deliver water; and
    an electronic valve, the electronic valve being operable to permit flow of water through the discharge outlet when the electronic valve is activated and to not permit flow of water through the discharge outlet when the electronic valve is deactivated, the electronic valve including a piston and a seat;
    the piston including a body and a nose, the body being upstream of the nose, the nose including a conical portion and a cylindrical portion, the conical portion of the nose being upstream of the cylindrical portion of the nose;
    the seat including a body, the body including a central opening extending therethrough, the central opening including an inlet portion, a first cylindrical portion, a conical portion, and a second cylindrical portion, the first cylindrical portion of the central opening in the seat being upstream of the conical portion of the central opening in the seat, the conical portion of the central opening in the seat being upstream of the second cylindrical portion of the central opening in the seat;
    wherein the nose of the piston is operable to be received in and move in and out of the central opening in the seat; and
    wherein, in a completely closed position, the conical portion of the nose of the piston is received in the conical portion of the central opening in the seat and the cylindrical portion of the nose of the piston is received in the second cylindrical portion of the central opening in the seat.

4. The electronic plumbing fixture fitting of claim 3, wherein a geometry of the nose of the piston generally corresponds to a geometry of the central opening in the seat.

5. The electronic plumbing fixture fitting of claim 3, wherein a geometry of the conical portion and the cylindrical portion of the nose of the piston generally corresponds to a geometry of the conical portion and the second cylindrical portion of the central opening in the seat.

6. The electronic plumbing fixture fitting of claim 3, wherein opposing surfaces of the conical portion and the cylindrical portion of the nose of the piston and the conical portion and the second cylindrical portion of the central opening in the seat are generally parallel.

7. The electronic plumbing fixture fitting of claim 3, wherein:
    the conical portion of the central opening in the seat has an angle;
    the conical portion of the nose of the piston has an angle; and
    the angle of the conical portion of the central opening in the seat is less than the angle of the conical portion of the nose of the piston.

8. The electronic plumbing fixture fitting of claim 3, wherein:

the inlet portion of the central opening in the seat has an angle; and the angle of the inlet portion of the central opening in the seat is between approximately twenty-five degrees and seventy-five degrees.

9. The electronic plumbing fixture fitting of claim 3, wherein, with a supply line pressure of approximately forty-five pounds per square inch and no restriction on flow downstream of the electronic valve, for a first twenty-five percent of a maximum number of steps provided by a motor of the electronic valve, a flow rate through the electronic valve does not exceed approximately six tenths gallons per minute.

10. The electronic plumbing fixture fitting of claim 3, wherein:

the electronic valve has a sealing zone, the sealing zone being a region where a sealing member on one of the piston and the seat interfaces with the other of the piston and the seat;

the electronic valve has a flow control zone, at any given position of the piston relative to the seat, the flow control zone being a region where a downstream end of the cylindrical portion of the nose of the piston interfaces with the seat; and the sealing zone is separate from the flow control zone.

11. The electronic plumbing fixture fitting of claim 10, wherein the sealing zone is upstream of the flow control zone.

12. An electronic plumbing fixture fitting, comprising:

a discharge outlet, the discharge outlet being operable to deliver water; and an electronic valve, the electronic valve being operable to permit flow of water through the discharge outlet when the electronic valve is activated and to not permit flow of water through the discharge outlet when the electronic valve is deactivated, the electronic valve including a piston and a seat;

the piston including a body and a nose, the nose including a conical portion and a cylindrical portion, the conical portion of the nose being upstream of the cylindrical portion of the nose;

the seat including a body, the body including a central opening extending therethrough, the central opening including an inlet portion, a conical portion, and a cylindrical portion, the conical portion of the central opening in the seat being upstream of the cylindrical portion of the central opening in the seat;

the electronic valve having a sealing zone, the sealing zone being a region where a sealing member on one of the piston and the seat is in sealing contact with the other of the piston and the seat, the sealing zone being static;

the electronic valve having a flow control zone, at any given position of the piston relative to the seat, the flow control zone being a region where: (1) a portion of the piston interfaces with a portion of the seat, and (2) a distance between the portion of the piston and the portion of the seat is less than a distance between any other portion of the piston and any other portion of the seat, the flow control zone being dynamic;

wherein the nose of the piston is operable to be received in and move in and out of the central opening in the seat;

wherein, when the electronic valve is in a completely closed position, the sealing zone is pressurized, but the flow control zone is not pressurized; and wherein, as the electronic valve moves from: (1) a position where: (a) the sealing member on one of the piston and the seat has lost sealing contact with the other of the piston and the seat, and (b) a distance between the sealing member on one of the piston and the seat and the other of the piston and the seat is greater than the distance between the portion of the piston and the portion of the seat in the flow control zone through: (2) a completely open position, the sealing zone is separate from the flow control zone, and the flow control zone is a region where the cylindrical portion of the nose of the piston interfaces with the seat.

13. The electronic plumbing fixture fitting of claim 12, wherein the sealing zone is upstream of the flow control zone.

14. The electronic plumbing fixture fitting of claim 12, wherein the flow control zone is a region where the cylindrical portion of the nose of the piston interfaces with the seat.

15. The electronic plumbing fixture fitting of claim 12, wherein the flow control zone is a region where the cylindrical portion of the nose of the piston interfaces with the cylindrical portion of the central opening in the seat.

16. The electronic plumbing fixture fitting of claim 12, wherein the flow control zone is a region where the cylindrical portion of the nose of the piston interfaces with the conical portion of the central opening in the seat.

17. An electronic plumbing fixture fitting, comprising:

a discharge outlet, the discharge outlet being operable to deliver water; and an electronic valve, the electronic valve being operable to permit flow of water through the discharge outlet when the electronic valve is activated and to not permit flow of water through the discharge outlet when the electronic valve is deactivated, the electronic valve including a piston and a seat;

the piston including a body and a nose, the nose including a conical portion and a cylindrical portion, the conical portion of the nose being upstream of the cylindrical portion of the nose, the cylindrical portion of the nose including an upstream end and a downstream end;

the seat including a body, the body including a central opening extending therethrough, the central opening including an inlet portion, a conical portion, and a cylindrical portion, the conical portion of the central opening in the seat being upstream of the cylindrical portion of the central opening in the seat;

the electronic valve having a sealing zone, the sealing zone being a region where a sealing member on one of the piston and the seat is in sealing contact with the other of the piston and the seat, the sealing zone being static;

the electronic valve having a flow control zone, at any given position of the piston relative to the seat, the flow control zone being a region where: (1) a portion of the piston interfaces with a portion of the seat, and (2) a distance between the portion of the piston and the portion of the seat is less than a distance between any other portion of the piston and any other portion of the seat, the flow control zone being dynamic;

wherein the nose of the piston is operable to be received in and move in and out of the central opening in the seat;

wherein, when the electronic valve is in a completely closed position, the sealing zone is pressurized, but the flow control zone is not pressurized; and wherein, as the electronic valve moves from: (1) a position where: (a) the sealing member on one of the piston and the seat has lost sealing contact with the other of the piston and the seat, and (b) a distance between the sealing member on one of the piston and the seat and the other of the piston and the seat is greater than the distance between the portion of the piston and the portion of the seat in the flow control zone through: (2) a completely open position, the flow control zone is a region where the upstream end of the cylindrical portion of the nose of the piston is received within the seat, and the downstream end of the cylindrical portion of the nose of the piston interfaces with the seat.

18. The electronic plumbing fixture fitting of claim 17, wherein the sealing zone is upstream of the flow control zone.

19. The electronic plumbing fixture fitting of claim 17, wherein the flow control zone is a region where the downstream end of the cylindrical portion of the nose of the piston interfaces with the cylindrical portion of the central opening in the seat.

20. The electronic plumbing fixture fitting of claim 17, wherein the flow control zone is a region where the downstream end of the cylindrical portion of the nose of the piston interfaces with the conical portion of the central opening in the seat.

* * * * *